United States Patent
Vieceli et al.

(10) Patent No.: US 10,540,783 B2
(45) Date of Patent: Jan. 21, 2020

(54) IMAGE ANALYSIS USEFUL FOR PATTERNED OBJECTS

(71) Applicant: Illumina, Inc., San Diego, CA (US)

(72) Inventors: John S. Vieceli, San Diego, CA (US);
Stephen Tanner, San Diego, CA (US);
John A. Moon, San Diego, CA (US);
M. Shane Bowen, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 14/530,299

(22) Filed: Oct. 31, 2014

(65) Prior Publication Data
US 2015/0125053 A1 May 7, 2015

Related U.S. Application Data

(60) Provisional application No. 61/898,612, filed on Nov. 1, 2013.

(51) Int. Cl.
*G06T 7/73* (2017.01)
(52) U.S. Cl.
CPC ..................................... *G06T 7/74* (2017.01)
(58) Field of Classification Search
CPC . G06T 2207/30024; G06T 2207/30204; G06T 7/0044
See application file for complete search history.

(56) References Cited

U.S. PATENT DOCUMENTS 5,528,050 A * 6/1996 Miller .................... G01J 3/4406
250/458.1
5,719,391 A * 2/1998 Kain ...................... G02B 21/16
250/235
(Continued)

FOREIGN PATENT DOCUMENTS

WO 1991/006678 5/1991
WO 2000/047996 8/2000
(Continued)

OTHER PUBLICATIONS

Gleason, S. S., et al, "Subpixel Measurement of Image Features Based on Paraboloid Surface Fit.," Intl. Soc. for Optical Eng. Conf., Boston, MA, Nov. 1990.*
(Continued)

*Primary Examiner* — Gandhi Thirugnanam
(74) *Attorney, Agent, or Firm* — Fletcher Yoder P.C.

(57) ABSTRACT

Embodiments for registering features in a repeating pattern are described. These embodiments can include providing an object having a repeating pattern of features and a fiducial. These embodiment can also include obtaining a target image of the object, where the target image includes the repeating pattern of features and the fiducial. These embodiment can also include comparing the fiducial in the target image to reference data, where the reference data includes xy coordinates for a virtual fiducial. These embodiment can also include determining locations for the features in the target image based on the comparison of the virtual fiducial in the reference data to the fiducial in the data from the target image. The fiducial can have at least concentric circles that produce three different signal levels. The locations of the features can be determined at a variance of less than 5 μm.

32 Claims, 8 Drawing Sheets

(56) References Cited

U.S. PATENT DOCUMENTS

| | | | | |
|---|---|---|---|---|
| 6,064,749 A * | 5/2000 | Hirota | G06F 3/011 | 345/7 |
| 6,266,459 B1 * | 7/2001 | Walt | B82Y 30/00 | 359/900 |
| 6,355,431 B1 * | 3/2002 | Chee | C12Q 1/6813 | 435/6.11 |
| 6,362,004 B1 * | 3/2002 | Noblett | B01J 19/0046 | 356/244 |
| 6,768,820 B1 * | 7/2004 | Yakhini | G06K 9/3275 | 382/129 |
| 6,770,441 B2 * | 8/2004 | Dickinson | B01J 19/0046 | 422/504 |
| 6,859,570 B2 * | 2/2005 | Walt | B01J 19/0046 | 359/900 |
| 7,057,026 B2 * | 6/2006 | Barnes | C07H 19/06 | 435/287.2 |
| 7,101,508 B2 * | 9/2006 | Thompson | B01J 19/0046 | 382/149 |
| 7,130,458 B2 * | 10/2006 | Bartell | B82Y 15/00 | 382/128 |
| 7,211,414 B2 * | 5/2007 | Hardin | C07H 19/06 | 435/6.1 |
| 7,269,518 B2 * | 9/2007 | Corson | B82Y 30/00 | 435/287.2 |
| 7,315,019 B2 * | 1/2008 | Turner | B01L 3/5085 | 250/227.11 |
| 7,329,492 B2 * | 2/2008 | Hardin | C12Q 1/6869 | 435/6.11 |
| 7,405,281 B2 * | 7/2008 | Xu | C07H 19/10 | 435/6.11 |
| 7,622,294 B2 * | 11/2009 | Walt | B01J 19/0046 | 385/12 |
| 7,695,683 B2 * | 4/2010 | Quan | B01L 3/5025 | 382/100 |
| 8,158,926 B2 * | 4/2012 | Feng | G01N 21/6428 | 250/208.2 |
| 8,241,573 B2 * | 8/2012 | Banerjee | C12Q 1/6869 | 382/128 |
| 8,503,745 B2 * | 8/2013 | Simon | A61B 6/12 | 382/128 |
| 8,778,848 B2 | 7/2014 | Lin et al. | | |
| 8,778,849 B2 | 7/2014 | Bowen et al. | | |
| 8,895,249 B2 * | 11/2014 | Shen | C12Q 1/6848 | 435/6.12 |
| 8,965,076 B2 | 2/2015 | Garcia et al. | | |
| 9,012,022 B2 * | 4/2015 | George | C09D 133/26 | 427/212 |
| 2001/0056289 A1 * | 12/2001 | Sippensgroenewegen | A61B 5/04023 | 607/5 |
| 2003/0027342 A1 * | 2/2003 | Sheridan | B01J 19/0046 | 436/43 |
| 2003/0161514 A1 * | 8/2003 | Curry | G01N 21/6452 | 382/128 |
| 2004/0109599 A1 * | 6/2004 | Cho | G06T 7/0042 | 382/145 |
| 2004/0179738 A1 * | 9/2004 | Dai | G06T 7/0002 | 382/218 |
| 2004/0218793 A1 * | 11/2004 | Corson | G06K 9/00 | 382/128 |
| 2004/0218795 A1 * | 11/2004 | Zhou | G06K 9/00 | 382/129 |
| 2004/0223661 A1 * | 11/2004 | Kraft | G06T 3/0093 | 382/287 |
| 2005/0100900 A1 * | 5/2005 | Kawashima | C12Q 1/6834 | 435/6.11 |
| 2006/0177116 A1 * | 8/2006 | Cattell | C12Q 1/6837 | 382/129 |
| 2006/0188901 A1 | 8/2006 | Barnes et al. | | |
| 2006/0240439 A1 * | 10/2006 | Smith | C12N 9/1252 | 435/6.12 |
| 2006/0281109 A1 * | 12/2006 | Barr Ost | C12Q 1/686 | 435/6.18 |
| 2007/0166705 A1 * | 7/2007 | Milton | C07H 19/06 | 435/6.11 |
| 2008/0123910 A1 * | 5/2008 | Zhu | A61B 90/36 | 382/128 |
| 2008/0240527 A1 * | 10/2008 | Keller | G06F 17/30259 | 382/128 |
| 2009/0080053 A1 * | 3/2009 | Cerrina | B01J 19/0046 | 359/238 |
| 2010/0161266 A1 * | 6/2010 | Meijles | G01N 21/93 | 702/94 |
| 2010/0204057 A1 * | 8/2010 | Lee | G01N 21/6452 | 506/9 |
| 2010/0296727 A1 * | 11/2010 | Stern | G01N 21/6452 | 382/154 |
| 2011/0059865 A1 * | 3/2011 | Smith | B01J 19/0046 | 506/16 |
| 2011/0092762 A1 * | 4/2011 | Wong | C12N 5/0604 | 600/34 |
| 2012/0020537 A1 * | 1/2012 | Garcia | G06T 7/0012 | 382/129 |
| 2012/0201421 A1 * | 8/2012 | Hartmann | A61B 6/12 | 382/103 |
| 2012/0270305 A1 * | 10/2012 | Reed | B01L 3/502715 | 435/287.2 |
| 2012/0316086 A1 * | 12/2012 | Lin | G01N 27/447 | 506/26 |
| 2013/0023422 A1 * | 1/2013 | Feng | G01N 21/05 | 506/4 |
| 2013/0116153 A1 * | 5/2013 | Bowen | B01J 19/0046 | 506/16 |
| 2013/0260372 A1 * | 10/2013 | Buermann | G01N 21/6428 | 435/6.1 |
| 2014/0243224 A1 * | 8/2014 | Barnard | C12N 15/1068 | 506/9 |
| 2015/0125053 A1 * | 5/2015 | Vieceli | G06T 7/74 | 382/129 |
| 2015/0154748 A1 * | 6/2015 | Bonanni | G06T 7/0012 | 382/129 |

FOREIGN PATENT DOCUMENTS

| | | |
|---|---|---|
| WO | 2000/063437 | 10/2000 |
| WO | 2004/018497 | 3/2004 |
| WO | 2005/065814 | 7/2005 |
| WO | 2006/064199 | 6/2006 |
| WO | 2007/010251 | 1/2007 |
| WO | 2007/123744 | 11/2007 |

OTHER PUBLICATIONS

Bentley, et al., "Accurate whole human genome sequencing using reversible terminator chemistry", Nature, vol. 456, No. 7218, Nov. 6, 2008, 53-59.

* cited by examiner

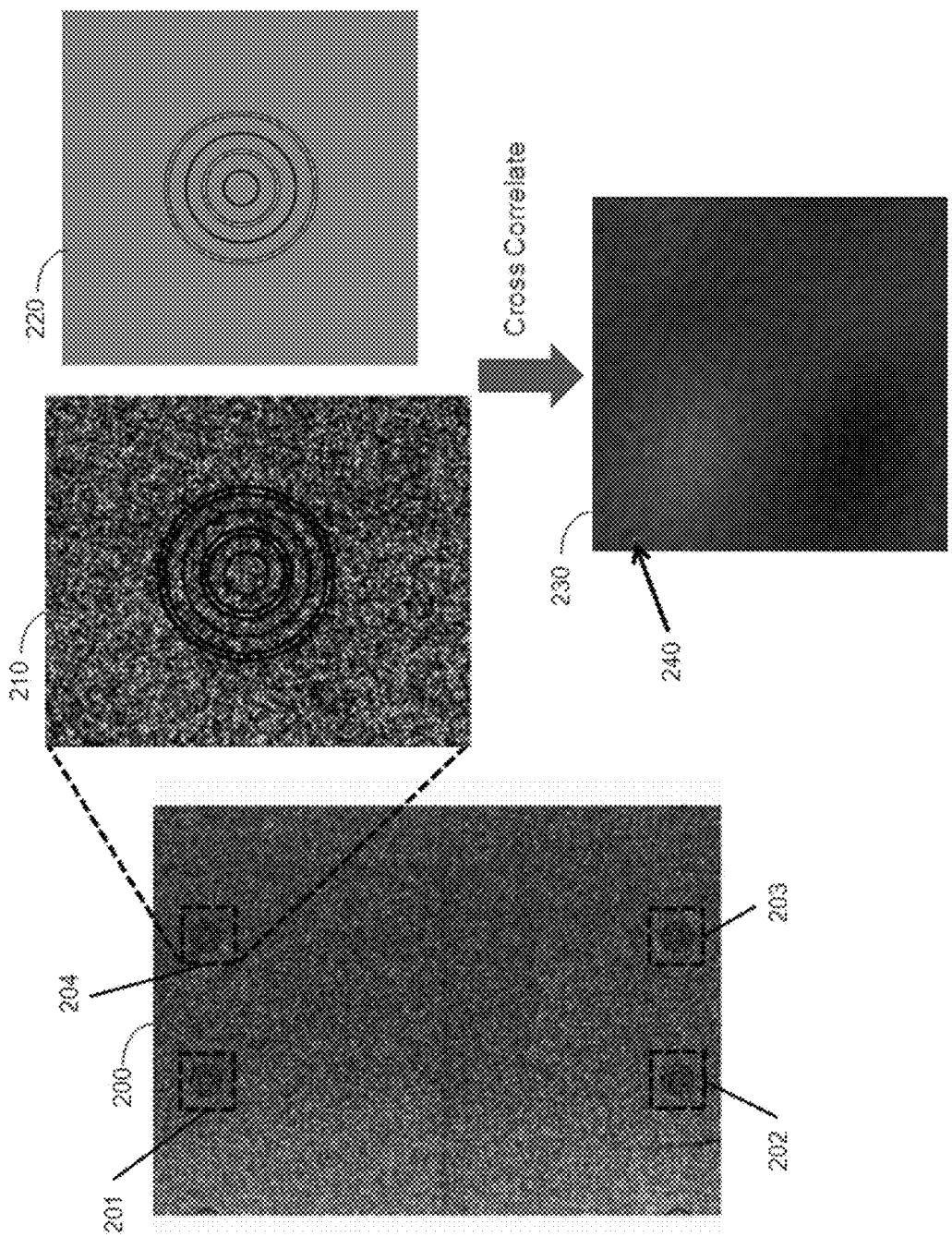

Fig. 6
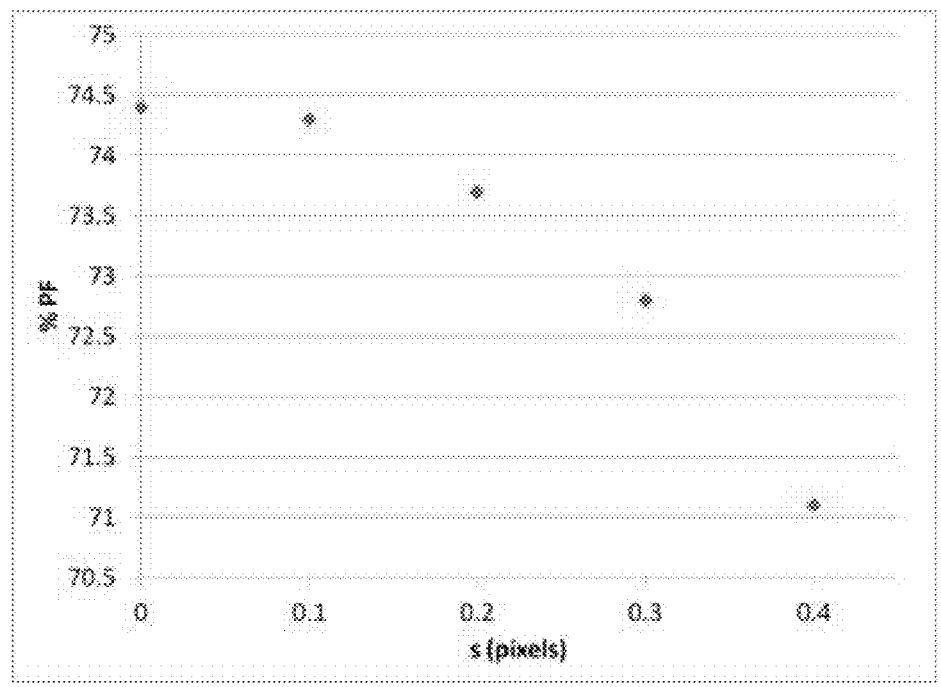
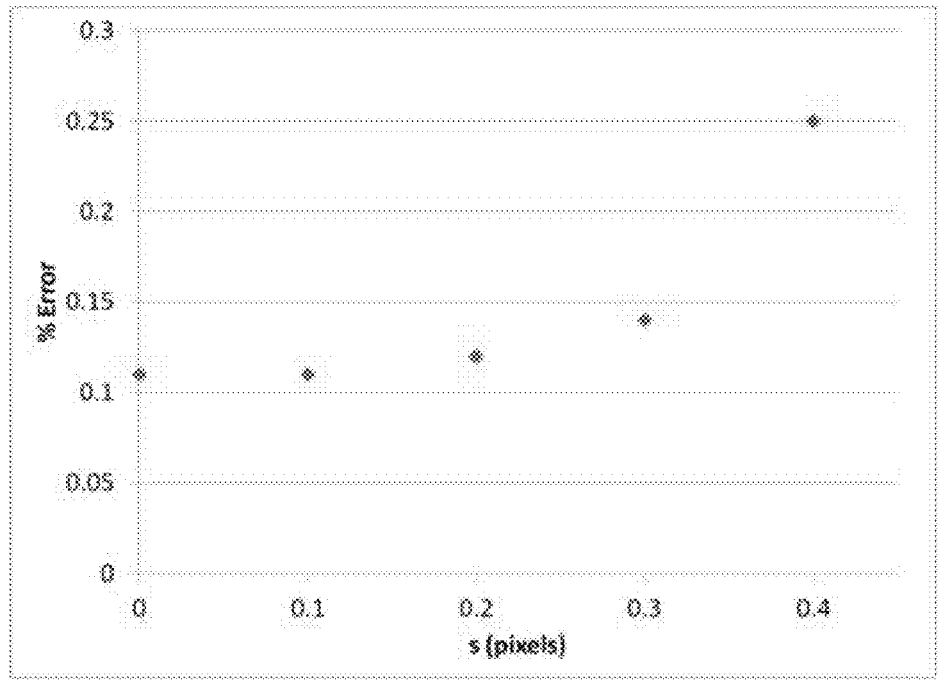

Fig. 7
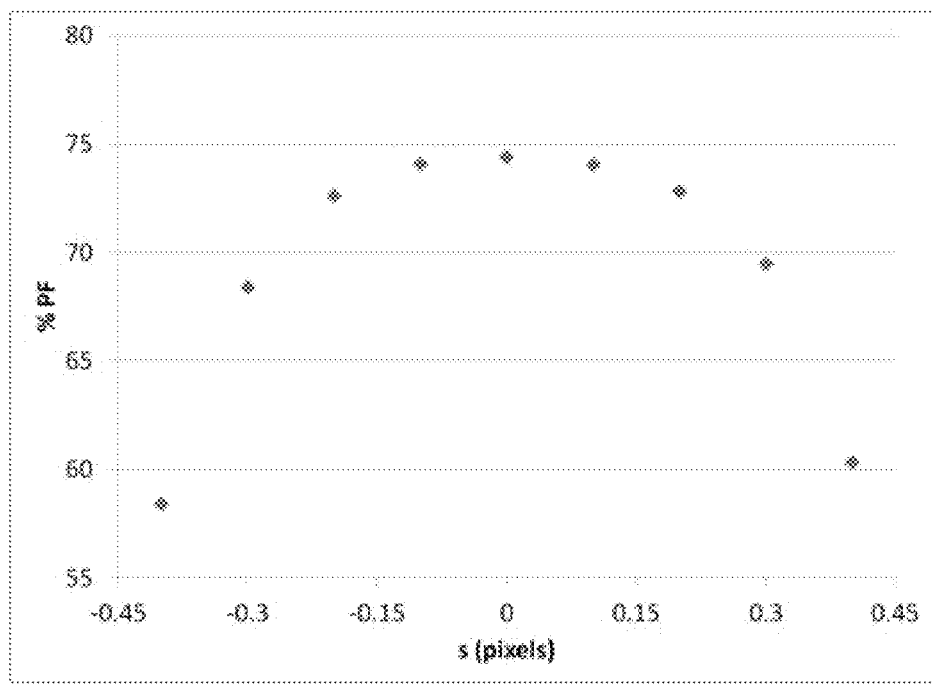
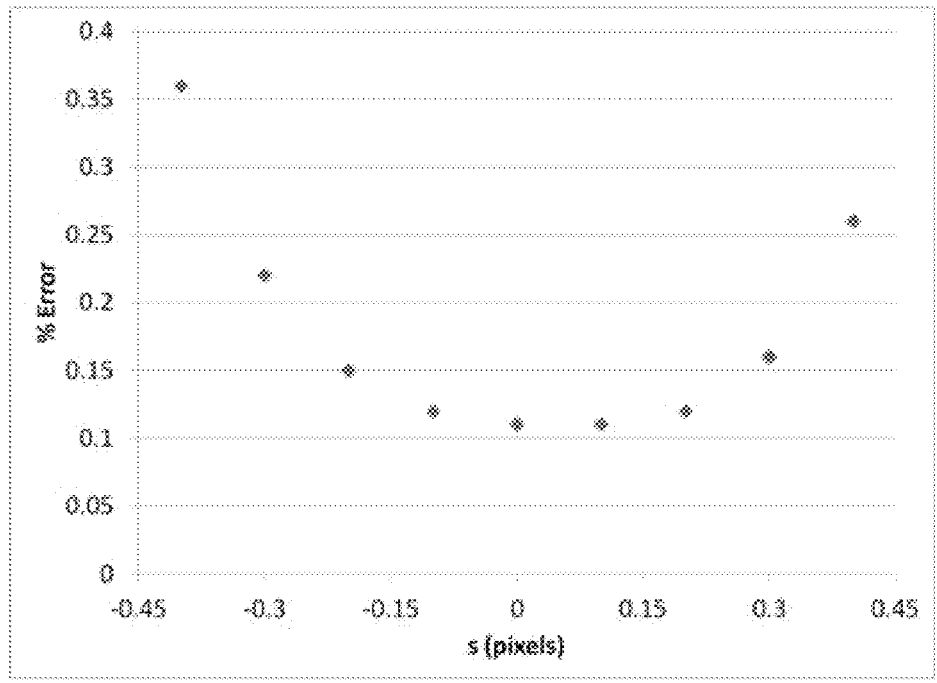

IMAGE ANALYSIS USEFUL FOR PATTERNED OBJECTS

RELATED APPLICATIONS

This application claims priority to U.S. Provisional Application No. 61/898,612 for "IMAGE ANALYSIS USEFUL FOR PATTERNED OBJECTS" filed on Nov. 1, 2013, which is hereby incorporated by reference.

BACKGROUND

This disclosure relates generally to analytical detection, and more specifically to imaging of nucleic acid arrays.

Nucleic acid arrays have become a key tool in a wide range of applications used to detect and analyze biological systems. In many of these applications, the arrays are engineered to include probes for nucleotide sequences present in genes in humans and other organisms. A test sample, for example, from a known person or organism, can be exposed to the array, such that nucleic acid fragments from the test sample hybridize to probes at the individual features in the array. Detection of the features of the array to which fragments from the sample have bound can be used to identify which sequences are present in the sample. Nucleic acid arrays may also be used for genetic sequencing. In general, genetic sequencing consists of determining the order of nucleotides or nucleic acid in a length of genetic material, such as a fragment of DNA or RNA. The technology is improving and ever larger nucleic acid samples, such as more complex genomes, are being sequenced on arrays.

For these and other applications of nucleic acid arrays, improvements have recently been made in detection hardware. For example, improvements in imaging systems allow for faster, more accurate and higher resolution scanning and imaging, particularly through the use of line-scanning and confocal control of imaging optics. However, as the density of features in the arrays increases, the size of the features decreases and the overall size of the arrays expand, accurate detection becomes problematic. The economic costs and time required for detection and image processing also becomes problematic.

Thus, there exists a need for accurate, rapid and cost effective image processing methods for nucleic acid arrays. The present disclosure addresses this need and provides other advantages as well.

BRIEF SUMMARY

The present disclosure provides a method of determining the locations of features in a repeating pattern. The method can include the steps of (a) providing an object having a repeating pattern of features in an xy plane and a fiducial; (b) obtaining a target image of the object using a detection apparatus, wherein the target image includes the repeating pattern of features and the fiducial; (c) providing data from the target image to a computer, wherein the computer has reference data, wherein the reference data includes xy coordinates for a virtual fiducial, and (d) performing an algorithm on the computer to determine locations for the features in the target image based on comparison of the virtual fiducial in the reference data to the fiducial in the data from the target image. Also provided is a system that includes a processor; a storage device; and a program including instructions for carrying out the above method.

The disclosure also provides a method of determining the locations of features in a repeating pattern, including the steps of (a) providing an object having a repeating pattern of features in an xy plane and a fiducial; (b) obtaining a target image of the object using a detection apparatus, wherein the target image includes the repeating pattern of features and the fiducial; (c) comparing the fiducial in the target image to reference data, wherein the reference data includes xy coordinates for a virtual fiducial; and (d) determining locations for the features in the target image based on the comparison of the virtual fiducial in the reference data to the fiducial in the data from the target image.

Further provided is a method of determining the locations of features in a repeating pattern. The method can include the steps of (a) providing an object having a repeating pattern of features in an xy plane and a fiducial; (b) obtaining a target image of the object using a detection apparatus, wherein the target image includes the repeating pattern of features and the fiducial; (c) providing data from the target image to a computer, wherein the computer includes reference data, wherein the reference data indicates xy coordinates for a virtual fiducial, and (d) performing an algorithm on the computer to determine locations for the features in the target image based on comparison of the virtual fiducial in the reference data to the fiducial in the data from the target image. In particular embodiments, the features each have an area of 100 µm² or less and a pitch of 5 µm or less and the locations of the features are determined at a variance of less than 5 µm. Also provided is a system that includes a processor; a storage device; and a program including instructions for carrying out the above method.

A method of determining the locations of features in a repeating pattern can include the steps of (a) providing an object having a repeating pattern of features in an xy plane and a fiducial; (b) obtaining a target image of the object using a detection apparatus, wherein the target image includes the repeating pattern of features and the fiducial; (c) comparing the fiducial in the target image to reference data, wherein the reference data indicates xy coordinates for a virtual fiducial; and (d) determining locations for the features in the target image based on the comparison of the virtual fiducial in the reference data to the fiducial in the data from the target image. In particular embodiments the fiducial has concentric circles and 3 different circles in the fiducial produce three different signal levels, respectively. In such embodiments, the virtual fiducial can simulate predefined signal levels and xy coordinates for the 3 different circles. Also provided is a system that includes a processor; a storage device; and a program including instructions for carrying out the above method.

BRIEF DESCRIPTION OF THE DRAWINGS

FIG. 4 shows a diagrammatic representation of a method for registering images of patterned arrays using a bulls-eye fiducial.

FIG. 6 shows plots of fiducial cross correlation sensitivity for fiducial-based registration of a patterned array.

FIG. 7 shows plots of transformed location sensitivity for fiducial-based registration of a patterned array.

DETAILED DESCRIPTION

Figure 1:
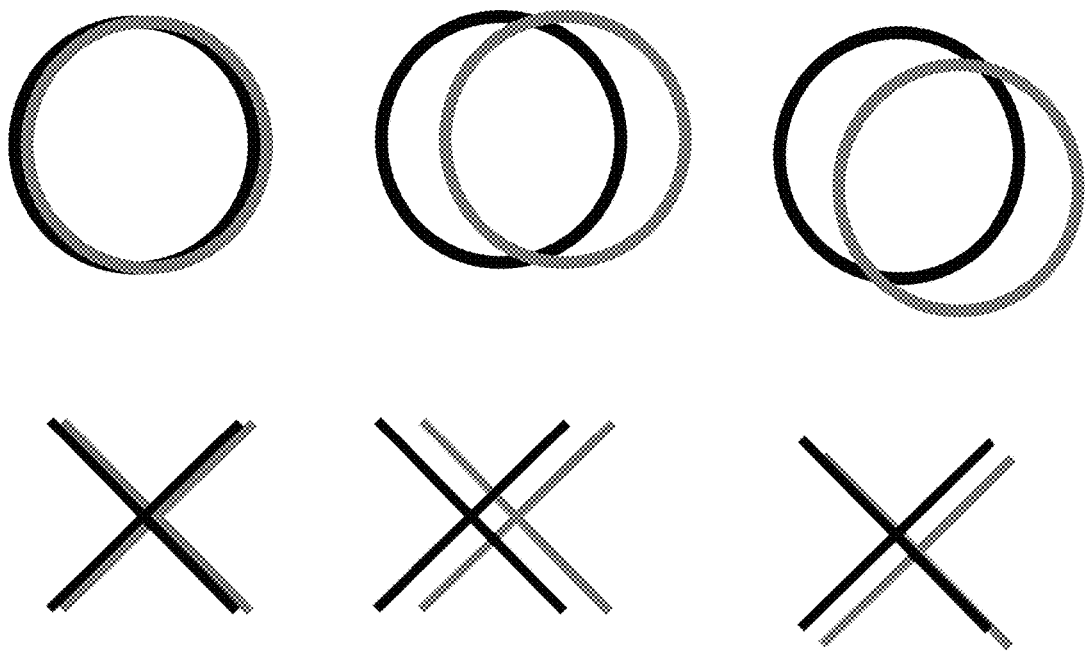
FIG. 1 shows diagrammatic representations of overlays for two types of fiducials at different offsets.

This disclosure provides methods and systems of image analysis that are particularly useful for locating features in regular patterns. The systems and methods can be used to register multiple images of a regular pattern of features. Particularly relevant patterns are those that result from images of analytical arrays such as those used for nucleic acid analysis, protein analysis or cell analysis. Such arrays can contain repeating patterns of features that are to be resolved at low micron or sub micron resolution, ranges for which the methods and systems of the present disclosure are well suited. Although the systems and methods set forth herein provide advantages when analyzing regular patterns of features, it will be understood that they can be used for random distributions of features as well.

The systems and methods of the present disclosure are robust to changes in characteristics of the features in the pattern. The changes may manifest as different signal properties detected for one or more features in different images of the pattern. For example, in a typical nucleic acid sequencing technique, an array of nucleic acids is subjected to several cycles of biochemical processing and imaging. In some embodiments, each cycle can result in one of four different labels being detected at each feature depending upon the nucleotide base that is processed biochemically in that cycle. In such embodiments, four different images are obtained at a given cycle and each feature will be detected in only one of the four images. Alignment of the images for a given cycle presents unique challenges since features that are detected in one image are typically dark in the other three images. Furthermore, a typical sequencing technique includes multiple cycles and alignment of images from sequential cycles is used to determine the sequence of nucleotides at each feature based on the sequence of labels detected at the respective feature. Improper registration of the four images within a cycle or improper registration of images across different cycles can have catastrophic effects on sequence analysis. In contrast to sequencing methods that use random patterns of nucleic acid features, methods that employ regular patterns are susceptible to walk-off errors during image analysis. A walk-off error occurs when two overlaid images are offset by one repeat unit of the pattern such that the patterns appear to overlap but features that are neighbors in the different patterns are improperly correlated in the overlay.

Terms used herein will be understood to take on their ordinary meaning in the relevant art unless specified otherwise. Several terms used herein and their meanings are set forth below.

As used herein, the term "correction factor" is intended to mean a value or function that is applied to data to modify the target data in a desired way. For example, the data can be modified to increase its accuracy, relevance or applicability with regard to a particular situation. A value or function can be applied to the data by any of a variety of mathematical manipulations including, but not limited to addition, subtraction, division, multiplication, or a combination thereof. The function can be a mathematical formula, logic function, computer implemented algorithm or the like. The data can be empirical data, simulated data, predicted data, target image data, virtual image data or a combination thereof. A correction factor can be provided in a computer readable format or medium such as one or more of those set forth elsewhere herein.

As used herein, the term "dark" is intended to refer to an amount of desired signal detected by a detector that is insignificant compared to background signal detected by the detector. For example, a feature of an object may be considered to be dark when the signal to noise ratio for the feature is substantially low, for example, being less than 1. In some embodiments a dark feature may not produce any amount of a desired signal (i.e. no signal is produced or detected). In other embodiments, a very low amount of signal, relative to background, may be considered as dark.

As used herein, the term "each," when used in reference to a collection of items, is intended to identify an individual item in the collection but does not necessarily refer to every item in the collection. Exceptions can occur if explicit disclosure or context clearly dictates otherwise.

As used herein, the term "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof). Different molecules that are at different features of a pattern can be differentiated from each other according to the locations of the features in the pattern. Exemplary features include without limitation, wells in a substrate, beads (or other particles) in or on a substrate, projections from a substrate, ridges on a substrate, pads of gel material on a substrate, or channels in a substrate.

As used herein, the term "fiducial" is intended to mean a distinguishable point of reference in or on an object. The point of reference can be, for example, a mark, second object, shape, edge, area, irregularity, channel, pit, post or the like. The point of reference can be present in an image of the object or in another data set derived from detecting the object. The point of reference can be specified by an x and/or y coordinate in a plane of the object. Alternatively or additionally, the point of reference can be specified by a z coordinate that is orthogonal to the xy plane, for example, being defined by the relative locations of the object and a detector. One or more coordinates for a point of reference can be specified relative to one or more other features of an object or of an image or other data set derived from the object.

As used herein, the term "footprint" is intended to mean the perimeter of an object, fiducial, feature or other thing in a plane. For example, a footprint can be defined by coordinates in an xy plane orthogonal to a detector that observes the plane. A footprint can be characterized by shape (e.g. circular, square, rectangular, triangular, polyhedral, oval etc.) and/or by area (e.g. at least 1 $\mu m^2$, 5 $\mu m^2$, 10 $\mu m^2$, 100 $\mu m^2$, 1000 $\mu m^2$, 1 $mm^2$ etc.).

As used herein, the term "image" is intended to mean a representation of all or part of an object. The representation can be an optically detected reproduction. For example, an image can be obtained from fluorescent, luminescent, scatter, or absorption signals. The part of the object that is present in an image can be the surface or other xy plane of the object. Typically, an image is a 2 dimensional representation, but in some cases information in the image can be derived from 3 dimensions. An image need not include optically detected signals. Non-optical signals can be present instead. An image can be provided in a computer readable format or medium such as one or more of those set forth elsewhere herein.

As used herein, the term "optical signal" is intended to include, for example, fluorescent, luminescent, scatter, or absorption signals. Optical signals can be detected in the ultraviolet (UV) range (about 200 to 390 nm), visible (VIS) range (about 391 to 770 nm), infrared (IR) range (about 0.771 to 25 microns), or other range of the electromagnetic spectrum. Optical signals can be detected in a way that excludes all or part of one or more of these ranges.

As used herein, the term "reference data" is intended to mean information pertaining to the relative locations of two or more things. For example, the information can pertain to the relative locations of at least one fiducial and an object upon which it occurs, the relative locations of at least one fiducial on an object and at least one feature on the object, the relative locations of two or more features on an object, the relative locations of a detector and an object, the relative locations of two or more parts of a fiducial, or the like. The information can be in any of a variety of formats that indicate relative locations including, but not limited to, numerical coordinates, pixel identities, an image or the like. Reference data can be provided in a computer readable format or medium such as one or more of those set forth elsewhere herein.

As used herein, the term "repeating pattern," when used in reference to features, is intended to mean that the relative locations of a subset of features in one region of the object is the same as the relative locations of a subset of features in at least one other region of the object. The one region is typically adjacent to that other region in the pattern. The relative locations for features in one region of a repeating pattern are generally predictable from the relative locations of features in another region of the repeating pattern. The subset used for the measure will generally include at least 2 features but can include at least, 3, 4, 5, 6, 10 or more features. Alternatively or additionally, the subset used for the measure can include no more than 2, 3, 4, 5, 6, or 10 features. Exemplary repeating patterns include rectilinear patterns and hexagonal patterns. A repeating pattern can include multiple repetitions of a sub-pattern.

As used herein, the term "scan a line" is intended to mean detecting a 2-dimensional cross-section in an xy plane of an object, the cross-section being rectangular or oblong, and causing relative movement between the cross-section and the object. For example, in the case of fluorescence imaging an area of an object having rectangular or oblong shape can be specifically excited (at the exclusion of other areas) and/or emission from the area can be specifically acquired (at the exclusion of other areas) at a given time point in the scan. Exemplary 2-dimensional cross-sections of a detection line include, but are not limited to, a rectangular, elliptical, or oval shape. The cross-sectional width of a detection line can have one or both dimensions in a range of, for example, about 0.05 µm to about 10 µm. For example, the longest dimension of the detection line can be at least about 0.05 µm, 0.1 µm, 0.5 µm, 1 µm, 5 µm or 10 µm. Alternatively or additionally, the longest dimension of a detection line can be, for example, at most about 0.1 µm, 0.5 µm, 1 µm, 5 µm or 10 µm. It will be understood that these dimensions are merely exemplary and detection lines having other dimensions can be used if desired. In particular embodiments the detection line is a radiation line, the radiation line being a collection of electromagnetic waves or particles propagated in a uniform direction, wherein the 2-dimensional cross-section, orthogonal to the direction of propagation, is rectangular or oblong.

As used herein, the term "signal level" is intended to mean an amount or quantity of detected energy or coded information that has a desired or predefined characteristic. For example, an optical signal can be quantified by one or more of intensity, wavelength, energy, frequency, power, luminance or the like. Other signals can be quantified according to characteristics such as voltage, current, electric field strength, magnetic field strength, frequency, power, temperature, etc. Absence of signal is understood to be a signal level of zero or a signal level that is not meaningfully distinguished from noise.

As used herein, the term "simulate" is intended to mean creating a representation or model of a physical thing or action. The representation or model can in many cases be distinguishable from the thing or action. For example, the representation or model can be distinguishable from a thing with respect to one or more characteristic such as color, intensity of signals detected from all or part of the thing, size, or shape. In particular embodiments, the representation or model can be idealized, exaggerated, muted, or incomplete when compared to the thing or action. Thus, in some embodiments, a representation of model can be distinguishable from the thing or action that it represents, for example, with respect to at least one of the characteristics set forth above. The representation or model can be provided in a computer readable format or medium such as one or more of those set forth elsewhere herein.

As used herein, the term "specific signal" is intended to mean detected energy or coded information that is selectively observed over other energy or information such as background energy or information. For example, a specific signal can be an optical signal detected at a particular intensity, wavelength or color; an electrical signal detected at a particular frequency, power or field strength; or other signals known in the art pertaining to spectroscopy and analytical detection.

As used herein, the term "stretching distortion" is intended to mean an aberration along a single axis. For example, a stretching distortion can be an aberration caused by a lens or other optical component(s) of an optical system, whereby the magnification varies along one axis (e.g. the x axis in the case of a line that is scanned along they axis). A "spreading distortion" is an aberration along 2 axes. For example, a spreading distortion can be an aberration caused by a lens or other optical component(s) of an optical system, whereby the magnification varies along the x and y axis (e.g. in the case of an area image).

As used herein, the term "swath" is intended to mean a rectangular portion of an object. The swath can be an elongated strip that is scanned by relative movement between the object and a detector in a direction that is parallel to the longest dimension of the strip. Generally, the width of the rectangular portion or strip will be constant along its full length. Multiple swaths of an object can be parallel to each other. Multiple swaths of an object can be adjacent to each other, overlapping with each other, abutting each other, or separated from each other by an interstitial area.

As used herein, the term "variance" is intended to mean a difference between that which is expected and that which is observed or a difference between two or more observations. For example, variance can be the discrepancy between an expected value and a measured value. Variance can be represented using statistical functions such as standard deviation, the square of standard deviation, coefficient of variation or the like.

As used herein, the term "virtual fiducial" is intended to mean a point of reference that is applied to an object or image and that is derived from a source other than the object or image, respectively. For example, a virtual fiducial can be derived from a first object (such as a template object or standard object) and applied to an image for a second object. Alternatively a virtual fiducial can be derived from a design, drawing or plan used to create the object. A virtual fiducial can be represented or specified as exemplified herein for other fiducials. A virtual fiducial can be provided in a computer readable format or medium such as one or more of those set forth elsewhere herein.

As used herein, the term "xy coordinates" is intended to mean information that specifies location, size, shape, and/or orientation in an xy plane. The information can be, for example, numerical coordinates in a Cartesian system. The coordinates can be provided relative to one or both of the x and y axes or can be provided relative to another location in the xy plane. For example, coordinates of a feature of an object can specify the location of the feature relative to location of a fiducial or other feature of the object.

As used herein, the term "xy plane" is intended to mean a 2 dimensional area defined by straight line axes x and y. When used in reference to a detector and an object observed by the detector, the area can be further specified as being orthogonal to the direction of observation between the detector and object being detected.

As used herein, the term "z coordinate" is intended to mean information that specifies the location of a point, line or area along an axes that is orthogonal to an xy plane. In particular embodiments, the z axis is orthogonal to an area of an object that is observed by a detector. For example, the direction of focus for an optical system may be specified along the z axis.

The embodiments set forth below and recited in the claims can be understood in view of the above definitions.

The present disclosure provides a method of determining the locations of features in a repeating pattern. The method can include the steps of (a) providing an object having a repeating pattern of features in an xy plane and a fiducial; (b) obtaining a target image of the object using a detection apparatus, wherein the target image includes the repeating pattern of features and the fiducial; (c) providing data from the target image to a computer, wherein the computer includes reference data, wherein the reference data indicates xy coordinates for a virtual fiducial, and (d) performing an algorithm on the computer to determine locations for the features in the target image based on comparison of the virtual fiducial in the reference data to the fiducial in the data from the target image. In particular embodiments, the features each have an area of 100 $\mu m^2$ or less and a pitch of 5 $\mu m$ or less and the locations of the features are determined at a variance of less than 5 $\mu m$.

Also provided is a method of determining the locations of features in a repeating pattern, wherein the steps include (a) providing an object having a repeating pattern of features in an xy plane and a fiducial; (b) obtaining a target image of the object using a detection apparatus, wherein the target image includes the repeating pattern of features and the fiducial; (c) comparing the fiducial in the target image to reference data, wherein the reference data indicates xy coordinates for a virtual fiducial; and (d) determining locations for the features in the target image based on the comparison of the virtual fiducial in the reference data to the fiducial in the data from the target image. In particular embodiments the fiducial has concentric circles and 3 different circles in the fiducial produce three different signal levels, respectively. In such embodiments, the virtual fiducial can simulate predefined signal levels and xy coordinates for the 3 different circles.

Generally several embodiments will be described herein with respect to a method of analysis. It will be understood that systems are also provided for carrying out the methods in an automated or semi-automated way. Accordingly, this disclosure provides systems for determining the locations of features in a repeating pattern, wherein the systems can include a processor; a storage device; and a program for image analysis, the program including instructions for carrying out one or more of the methods set forth herein. Accordingly, the methods set forth herein can be carried out on a computer, for example, having components set forth herein or otherwise known in the art.

The methods and systems set forth herein are useful for analyzing any of a variety of objects. Particularly useful objects are solid supports or solid-phase surfaces with attached analytes. The methods and systems set forth herein provide advantages when used with objects having a repeating pattern of features in an xy plane. An example is a microarray having an attached collection of cells, viruses, nucleic acids, proteins, antibodies, carbohydrates, small molecules (such as drug candidates), biologically active molecules or other analytes of interest.

An increasing number of applications have been developed for arrays with features having biological molecules such as nucleic acids and polypeptides. Such microarrays typically include deoxyribonucleic acid (DNA) or ribonucleic acid (RNA) probes. These are specific for nucleotide sequences present in humans and other organisms. In certain applications, for example, individual DNA or RNA probes can be attached at individual features of an array. A test sample, such as from a known person or organism, can be exposed to the array, such that target nucleic acids (e.g. gene fragments, mRNA, or amplicons thereof) hybridize to complementary probes at respective features in the array. The probes can be labeled in a target specific process (e.g. due to labels present on the target nucleic acids or due to enzymatic labeling of the probes or targets that are present in hybridized form at the features). The array can then be examined by scanning specific frequencies of light over the features to identify which target nucleic acids are present in the sample.

Biological microarrays may be used for genetic sequencing and similar applications. In general, genetic sequencing consists of determining the order of nucleotides in a length of target nucleic acid, such as a fragment of DNA or RNA. Relatively short sequences are typically sequenced at each feature, and the resulting sequence information may be used in various bioinformatics methods to logically fit the sequence fragments together so as to reliably determine the sequence of much more extensive lengths of genetic material from which the fragments were derived. Automated, computer-based algorithms for characteristic fragments have been developed, and have been used more recently in genome mapping, identification of genes and their function, and so forth. Microarrays are particularly useful for characterizing genomic content because a large number of variants are present and this supplants the alternative of performing many experiments on individual probes and targets. The microarray is an ideal format for performing such investigations in a practical manner.

Any of a variety of analyte arrays (also referred to as "microarrays") known in the art can be used in a method or system set forth herein. A typical array contains features, each having an individual probe or a population of probes. In the latter case, the population of probes at each feature is typically homogenous having a single species of probe. For example, in the case of a nucleic acid array, each feature can have multiple nucleic acid molecules each having a common sequence. However, in some embodiments the populations at each feature of an array can be heterogeneous. Similarly, protein arrays can have features with a single protein or a population of proteins typically, but not always, having the same amino acid sequence. The probes can be attached to the surface of an array for example, via covalent linkage of the probes to the surface or via non-covalent interaction(s) of the probes with the surface. In some embodiments, probes, such as nucleic acid molecules, can be attached to a surface via a gel layer as described, for example, in U.S. patent application Ser. No. 13/784,368 and US Pat. App. Pub. No. 2011/0059865 A1, each of which is incorporated herein by reference.

Exemplary arrays include, without limitation, a BeadChip Array available from Illumina, Inc. (San Diego, Calif.) or others such as those where probes are attached to beads that are present on a surface (e.g. beads in wells on a surface) such as those described in U.S. Pat. Nos. 6,266,459; 6,355,431; 6,770,441; 6,859,570; or 7,622,294; or PCT Publication No. WO 00/63437, each of which is incorporated herein by reference. Further examples of commercially available microarrays that can be used include, for example, an Affymetrix® GeneChip® microarray or other microarray synthesized in accordance with techniques sometimes referred to as VLSIPS™ (Very Large Scale Immobilized Polymer Synthesis) technologies. A spotted microarray can also be used in a method or system according to some embodiments of the present disclosure. An exemplary spotted microarray is a CodeLink™ Array available from Amersham Biosciences. Another microarray that is useful is one that is manufactured using inkjet printing methods such as SurePrint™ Technology available from Agilent Technologies.

Other useful arrays include those that are used in nucleic acid sequencing applications. For example, arrays having amplicons of genomic fragments (often referred to as clusters) are particularly useful such as those described in Bentley et al., *Nature* 456:53-59 (2008), WO 04/018497; WO 91/06678; WO 07/123744; U.S. Pat. Nos. 7,329,492; 7,211,414; 7,315,019; 7,405,281, or 7,057,026; or US Pat. App. Pub. No. 2008/0108082 A1, each of which is incorporated herein by reference. Another type of array that is useful for nucleic acid sequencing is an array of particles produced from an emulsion PCR technique. Examples are described in Dressman et al., *Proc. Natl. Acad. Sci. USA* 100:8817-8822 (2003), WO 05/010145, US Pat. App. Pub. No. 2005/0130173 or US Pat. App. Pub. No. 2005/0064460, each of which is incorporated herein by reference in its entirety.

Arrays used for nucleic acid sequencing often have random spatial patterns of nucleic acid features. For example, HiSeq or MiSeq sequencing platforms available from Illumina Inc. (San Diego, Calif.) utilize flow cells upon which nucleic acid arrays are formed by random seeding followed by bridge amplification. However, patterned arrays can also be used for nucleic acid sequencing or other analytical applications. Exemplary patterned arrays, methods for their manufacture and methods for their use are set forth in U.S. Ser. Nos. 13/787,396; 13/783,043; 13/784,368; US Pat. App. Pub. No. 2013/0116153 A1; and US Pat. App. Pub. No. 2012/0316086 A1, each of which is incorporated herein by reference. The features of such patterned arrays can be used to capture a single nucleic acid template molecule to seed subsequent formation of a homogenous colony, for example, via bridge amplification. Such patterned arrays are particularly useful for nucleic acid sequencing applications.

The size of a feature on an array (or other object used in a method or system herein) can be selected to suit a particular application. For example, in some embodiments a feature of an array can have a size that accommodates only a single nucleic acid molecule. A surface having a plurality of features in this size range is useful for constructing an array of molecules for detection at single molecule resolution. Features in this size range are also useful for use in arrays having features that each contain a colony of nucleic acid molecules. Thus, the features of an array can each have an area that is no larger than about 1 $mm^2$, no larger than about 500 $\mu m^2$, no larger than about 100 $\mu m^2$, no larger than about 10 $\mu m^2$, no larger than about 1 $\mu m^2$, no larger than about 500 $nm^2$, or no larger than about 100 $nm^2$, no larger than about 10 $nm^2$, no larger than about 5 $nm^2$, or no larger than about 1 $nm^2$. Alternatively or additionally, the features of an array will be no smaller than about 1 $mm^2$, no smaller than about 500 $\mu m^2$, no smaller than about 100 $\mu m^2$, no smaller than about 10 $\mu m^2$, no smaller than about 1 $\mu m^2$, no smaller than about 500 $nm^2$, no smaller than about 100 $nm^2$, no smaller than about 10 $nm^2$, no smaller than about 5 $nm^2$, or no smaller than about 1 $nm^2$. Indeed, a feature can have a size that is in a range between an upper and lower limit selected from those exemplified above. Although several size ranges for features of a surface have been exemplified with respect to nucleic acids and on the scale of nucleic acids, it will be understood that features in these size ranges can be used for applications that do not include nucleic acids. It will be further understood that the size of the features need not necessarily be confined to a scale used for nucleic acid applications.

For embodiments that include an object having a plurality of features, such as an array of features, the features can be discrete, being separated with spaces between each other. An array useful in the invention can have features that are separated by edge to edge distance of at most 100 μm, 50 μm, 10 μm, 5 μm, 1 μm, 0.5 μm or less. Alternatively or additionally, an array can have features that are separated by an edge to edge distance of at least 0.5 μm, 1 μm, 5 μm, 10 μm, 50 μm, 100 μm or more. These ranges can apply to the average edge to edge spacing for features as well as to the minimum or maximum spacing.

In some embodiments the features of an array need not be discrete and instead neighboring features can abut each other. Whether or not the features are discrete, the size of the features and/or pitch of the features can vary such that arrays can have a desired density. For example, the average feature pitch in a regular pattern can be at most 100 μm, 50 μm, 10 μm, 5 μm, 1 μm, 0.5 μm or less. Alternatively or additionally, the average feature pitch in a regular pattern can be at least 0.5 μm, 1 μm, 5 μm, 10 μm, 50 μm, 100 μm or more. These ranges can apply to the maximum or minimum pitch for a regular pattern as well. For example, the maximum feature pitch for a regular pattern can be at most 100 μm, 50 μm, 10 μm, 5 μm, 1 μm, 0.5 μm or less; and/or the minimum feature pitch in a regular pattern can be at least 0.5 μm, 1 μm, 5 μm, 10 μm, 50 μm, 100 μm or more.

The density of features in an array can also be understood in terms of the number of features present per unit area. For example, the average density of features for an array can be at least about $1 \times 10^3$ features/$mm^2$, $1 \times 10^4$ features/$mm^2$, $1 \times 10^5$ features/$mm^2$, $1 \times 10^6$ features/$mm^2$, $1 \times 10^7$ features/ mm², 1×10⁸ features/mm², or 1×10⁹ features/mm² or higher. Alternatively or additionally the average density of features for an array can be at most about 1×10⁹ features/mm², 1×10⁸ features/mm², 1×10⁷ features/mm², 1×10⁶ features/mm², 1×10⁵ features/mm², 1×10⁴ features/mm², or 1×10³ features/mm² or less.

The above ranges can apply to all or part of a regular pattern including, for example, all or part of an array of features.

The features in a pattern can have any of a variety of shapes. For example, when observed in a two dimensional plane, such as on the surface of an array, the features can appear rounded, circular, oval, rectangular, square, symmetric, asymmetric, triangular, polygonal, or the like. The features can be arranged in a regular repeating pattern including, for example, a hexagonal or rectilinear pattern. A pattern can be selected to achieve a desired level of packing. For example, round features are optimally packed in a hexagonal arrangement. Of course other packing arrangements can also be used for round features and vice versa.

A pattern can be characterized in terms of the number of features that are present in a subset that forms the smallest geometric unit of the pattern. The subset can include, for example, at least about 2, 3, 4, 5, 6, 10 or more features. Depending upon the size and density of the features the geometric unit can occupy an area of less than 1 mm², 500 µm², 100 µm², 50 µm², 10 µm², 1 µm², 500 nm², 100 nm², 50 nm², 10 nm² or less. Alternatively or additionally, the geometric unit can occupy an area of greater than 10 nm², 50 nm², 100 nm², 500 nm², 1 µm², 10 µm², 50 µm², 100 µm², 500 µm², 1 mm², or more. Characteristics of the features in a geometric unit, such as shape, size, pitch and the like, can be selected from those set forth herein more generally with regard to features in an array or pattern.

An array having a regular pattern of features can be ordered with respect to the relative locations of the features but random with respect to one or more other characteristic of each feature. For example, in the case of a nucleic acid array, the nuclei acid features can be ordered with respect to their relative locations but random with respect to one's knowledge of the sequence for the nucleic acid species present at any particular feature. As a more specific example, nucleic acid arrays formed by seeding a repeating pattern of features with template nucleic acids and amplifying the template at each feature to form copies of the template at the feature (e.g. via cluster amplification or bridge amplification) will have a regular pattern of nucleic acid features but will be random with regard to the distribution of sequences of the nucleic acids across the array. Thus, detection of the presence of nucleic acid material generally on the array can yield a repeating pattern of features, whereas sequence specific detection can yield non-repeating distribution of signals across the array.

It will be understood that the description herein of patterns, order, randomness and the like pertain not only to features on objects, such as features on arrays, but also to features in images. As such, patterns, order, randomness and the like can be present in any of a variety of formats that are used to store, manipulate or communicate image data including, but not limited to, a computer readable medium or computer component such as a graphical user interface or other output device.

In particular embodiments, fiducials are included on an object (or in an image) to facilitate identification and localization of individual features on the object. Fiducials are particularly useful for registering a spatially ordered pattern of features since the fiducials provide a point of reference for relative locations of other features. Fiducials are especially beneficial for applications where an array is detected repeatedly to follow changes occurring at individual features over time. For example, fiducials can allow individual nucleic acid clusters to be followed through sequential images obtained over multiple sequencing cycles, such that the sequence of nucleic acid species present at individual clusters can be discretely determined.

Useful fiducials can have any of a variety of shapes. An exemplary design for a fiducial marker is a set of concentric circles having an alternating color or brightness. For example, a bulls-eye fiducial is particularly useful, examples of which are set forth in U.S. Ser. No. 13/787,396, which is incorporated herein by reference. In one embodiment an array of wells or other features can include a fiducial that forms a pattern of multiple rings such as two or more of: a 'bright' ring that produces relatively high intensity signal on average, a 'dark' ring that produces relatively little or no signal on average, and an 'intermediate' ring that produces average signal of intermediate intensity compared to the other two rings. In some embodiments, the bright and intermediate rings contain the same types of probes that are detected at analyte features of an array, whereas those probes are absent at the dark rings. For example, in the case of nucleic acid arrays, a bright ring can contain a relatively large amount of nucleic acids that are labeled via the same methods that are used to label target nucleic acids at features of the array. In this example, or in other embodiments, the intermediate ring can include features or other more relatively disperse collection of labeled nucleic acids.

As exemplified by the bulls-eye fiducial above, circular symmetry is particularly useful for a fiducial. A fiducial having circular symmetry can be particularly useful in some embodiments for the following reasons. Registration of an image can be carried out by lining up (e.g. overlaying) a fiducial in the image with a fiducial in a reference image. The correlation of fit can be determined by computing a similarity measure such as the two-dimensional cross-correlation, sum of squared intensity differences or the like. Optimal correlation of fit can be identified as the positioning where the most bright pixels from the image overlap with bright pixels on the reference image, (or in some configurations where the most dim pixels on the image overlap the most dim pixels on the reference image).

FIG. 1 provides a visual demonstration of the advantages of evaluating overlay between 2 circular-shaped fiducials at three different offsets compared to a similar evaluation for two X-shaped fiducials at similar offsets, at least in some embodiments. When the target image (grey fiducials in FIG. 1) is shifted relative to the reference image (black fiducials in FIG. 1), the number of overlapping pixels decreases, as shown by the leftward shift of the grey fiducials relative to the black fiducials in FIG. 1. The greatest pixel overlap would occur when there was no offset between the target image and the reference image. As evident from the variously offset circular-shaped fiducials in FIG. 1, any movement between the black and grey circles that increases the number of overlapping pixels will be indicative of improved overall positional correlation for the fiducials. In contrast, for an X-shaped fiducial, the leftward shift from the correct line-up results in less pixel on pixel overlap than a shift down and to the left (i.e. sliding of the grey fiducial along one arm of the black fiducial). The symmetry of the circular fiducials allows them to be registered using less information than for the x-shaped fiducials.

A particularly useful configuration for a fiducial is that of two or more concentric circles, optionally with circles having differing brightness or color, as exemplified by the bulls-eye fiducial. The information provided by the differing brightness can be used to increase accuracy and speed of registration compared to use of only a single circle or compared to use of multiple circles with similar brightness.

It will be understood that circular symmetry, although providing certain advantages in particular embodiments set forth herein, is optional for fiducials. Other symmetries can be utilized instead. Furthermore, symmetry in general is optional and asymmetric fiducials can be used instead.

In particular embodiments, the fiducial will have a footprint that is larger than the area of each individual feature of an object that is to be registered. The fiducial will often have a footprint that is larger than the geometric unit of features that is repeated in a repeating pattern. Larger footprint for the fiducial can provide advantages of reducing the risk of 'walk-offs' or integral offsets (such as vertical or horizontal translation), where the registration can appear correct locally within a geometric unit of features in a repeating pattern, but each feature (or geometric unit of features) is mistaken for its neighbor.

The use of more than one fiducial in an object, system or method set forth herein can provide certain advantages. For example, more accurate registration can result when features are located relative to fiducials found in at least two, three or four regions of an image. In particular embodiments, the fiducials are found at or near at least 1, 2, 3 or four corners of a rectangular image.

A method of the present disclosure can include a step of obtaining a target image of an object using a detection apparatus, wherein the image includes a repeating pattern of features on the object and at least one fiducial also on the object. Detection apparatus that are capable of high resolution imaging of surfaces are particularly useful. In particular embodiments, the detection apparatus will have sufficient resolution to distinguish features at the densities, pitches and/or feature sizes set forth herein. Particularly useful are detection apparatus capable of obtaining images or image data from surfaces. Exemplary detectors are those that are configured to maintain an object and detector in a static relationship while obtaining an area image. Scanning apparatus can also be used. For example, an apparatus that obtains sequential area images (e.g. so called 'step and shoot' detectors) can be used. Also useful are devices that continually scan a point or line over the surface of an object to accumulate data to construct an image of the surface. Point scanning detectors can be configured to scan a point (i.e. a small detection area) over the surface of an object via a raster motion in the x-y plane of the surface. Line scanning detectors can be configured to scan a line along the y dimension of the surface of an object, the longest dimension of the line occurring along the x dimension. It will be understood that the detection device, object or both can be moved to achieve scanning detection. Detection apparatus that are particularly useful, for example in nucleic acid sequencing applications, are described in US Pat App. Pub. Nos. 2012/0270305 A1; 2013/0023422 A1; and 2013/0260372 A1; and U.S. Pat. Nos. 5,528,050; 5,719,391; 8,158,926 and 8,241,573, each of which is incorporated herein by reference.

A method of the present disclosure can further include a step of providing data from a target image to a computer. Various processes and steps of the methods set forth herein can be carried out using a computer. The computer can include a processor that is part of a detection device, networked with a detection device used to obtain the data that is processed by the computer or separate from the detection device. In some embodiments, information (e.g., image data) may be transmitted between components of a system disclosed herein directly or via a computer network. A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard. In some instances, the information (e.g., image data) is input to a system disclosed herein via an input device (e.g. disk drive, compact disk player, USB port etc.). In some instances, the information is received by loading the information, e.g., from a storage device such as a disk or flash drive.

A processor that is used to run an algorithm or other process set forth herein may comprise a microprocessor. The microprocessor may be any conventional general purpose single- or multi-chip microprocessor such as a Pentium™ processor made by Intel Corporation. A particularly useful computer can utilize an Intel Ivybridge dual-12 core processor, LSI raid controller, having 128 GB of RAM, and 2 TB solid state disk drive. In addition, the processor may comprise any conventional special purpose processor such as a digital signal processor or a graphics processor. The processor typically has conventional address lines, conventional data lines, and one or more conventional control lines.

The embodiments disclosed herein may be implemented as a method, apparatus, system or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices. In particular embodiments, information or algorithms set forth herein are present in non-transient storage media.

In particular embodiments, a computer implemented method set forth herein can occur in real time while multiple images of an object are being obtained. Such real time analysis is particularly useful for nucleic acid sequencing applications wherein an array of nucleic acids is subjected to repeated cycles of fluidic and detection steps. Analysis of the sequencing data can often be computationally intensive such that it can be beneficial to perform the methods set forth herein in real time or in the background while other data acquisition or analysis algorithms are in process. Exemplary real time analysis methods that can be used with the present methods are those used for the MiSeq and HiSeq sequencing devices commercially available from Illumina, Inc. (San Diego, Calif.) and/or described in US Pat. App. Pub. No. 2012/0020537 A1, which is incorporated herein by reference.

Figure 2:
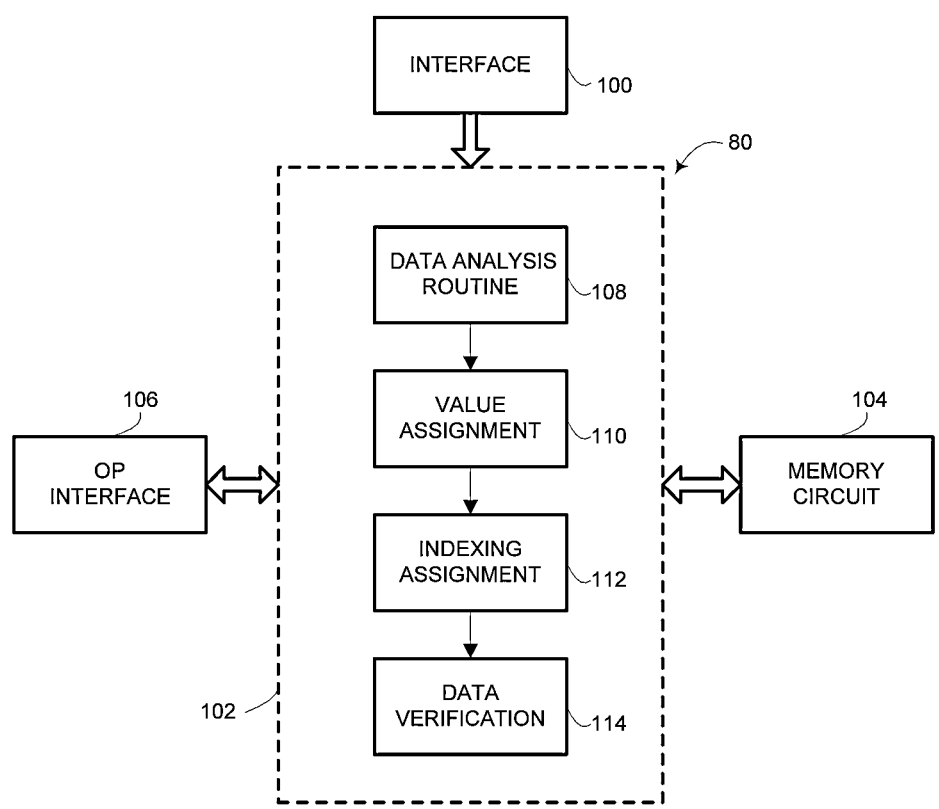
FIG. 2 shows an exemplary data analysis system.

FIG. 2 illustrates an exemplary data analysis system 80 and certain of its functional components. As noted above, the system will typically be formed by one or more programmed computers, with programming being stored on one or more machine readable media with code executed to carry out one or more steps of methods described herein. In the illustrated embodiment, for example, the system includes an interface 100 designed to permit networking of the system to one or more detection systems (e.g. optical imaging systems) that are configured to acquire data from target objects. The interface may receive and condition data, where appropriate. In particular embodiments the detection system will output digital image data, for example, image data that is representative of individual picture elements or pixels that, together, form an image of an array or other object. A processor, denoted generally by reference numeral 102, processes the received detection data in accordance with a one or more routines defined by processing code. The processing code may be stored in various types of memory circuitry, as represented generally by reference numeral 104.

In accordance with the presently contemplated embodiments, the processing code executed on the detection data includes a data analysis routine 108 designed to analyze the detection data to determine the locations of individual features visible or encoded in the data, as well as locations in which no feature is detected (i.e., where there is no feature, or where no meaningful signal was detected from an existing feature). In particular embodiments, locations in an array will typically appear brighter than non-feature locations due to the presence of fluorescing dyes attached to the imaged features. It will be understood that the features need not appear brighter than their surrounding area, for example, when a target for the probe at the feature is not present in an array being detected. The color at which individual features appear may be a function of the dye employed as well as of the wavelength of the light used by the imaging system for imaging purposes. Features to which targets are not bound or that are otherwise devoid of a particular label can be identified according to other characteristics, such as their expected location in the microarray.

It may be noted that as in the illustration of FIG. 2, an operator interface 106 can optionally be provided, which may consist of a conventional computer monitor, keyboard, mouse, and so forth to interact with the routines executed by the processor 102. The operator interface may be used to control, visualize or otherwise interact with the routines as imaging data is processed, analyzed and resulting values are indexed. For example, an operator interface can include a graphical user interface (GUI) that produces an image of a patterned array, fiducial, or other object set forth herein. Similarly, a GUI can produce an image showing information resulting from one or more steps of a method set forth herein.

Once the data analysis routine 108 has located individual features in the data, a value assignment may be carried out as indicated at reference numeral 110. In general, the value assignment carried out at step 110 will assign a digital value to each feature based upon characteristics of the data represented by detector components (e.g. pixels) at the corresponding location. That is, for example when imaging data is processed, the value assignment routine 110 may be designed to recognize that a specific color or wavelength of light was detected at a specific location, as indicated by a group or cluster of pixels at the location. In a typical DNA imaging application, for example, the four common nucleotides will be represented by four separate and distinguishable colors. Each color, then, may be assigned a value corresponding to that nucleotide.

An indexing assignment routine 112, then, can associate each of the assigned values with a location in an image index or map. The map will correspond to the known or determined locations of individual features within the microarray or other object, with the features being located relative to fiducial registration, as described herein. The present technique allows for indexing the assigned values by reference to one or more fiducial. Finally, a verification routine 114 may be performed, such as to verify alignment of the features within a series of images, the indexing of the features, and the quality of the data obtained.

A method set forth herein can further include steps of comparing a fiducial in a target image to reference data, wherein the reference data includes xy coordinates for a virtual fiducial; and determining locations for the features in the target image based on the comparison of the virtual fiducial in the reference data to the fiducial in the data from the target image. A computer algorithm can be used for this step. For example, a method set forth herein can include a step of performing an algorithm on a computer to determine locations for features in a target image based on comparison of a fiducial in data from the target image to a virtual fiducial in a reference image. In particular embodiments, the comparison is carried out by determining an offset between the target fiducial and the virtual fiducial. The target fiducial and virtual fiducial can be provided in any of a variety of data formats that are convenient or desired for the comparison method used. For example, the fiducials can be provided as images, pixel maps, tables or lists of xy coordinates or the like. In particular embodiments, fiducials can be provided as text or binary encoded files.

Registration of a target fiducial (e.g. a fiducial in a target data set) with respect to a virtual fiducial (e.g. a fiducial in a reference data set) can be carried out by lining up (e.g. overlaying) the fiducials; determining the two dimensional cross-correlation (or other measure of the similarity of fit), for example, based on the number of bright pixels from the target image fiducial that overlap with bright pixels of the virtual fiducial; and determining the offset between the fiducials. The offset can be determined, for example, via an iterative process whereby the following steps are repeated: one of the fiducials is shifted relative to the other, the change in level of correlation of fit is determined (e.g. an increase in correlation being indicated by an increase in the number of bright pixels of the target fiducial that overlap with a bright pixel of the virtual fiducial), shifting the fiducials in a direction that increases the correlation of fit. Iterations can proceed until an offset that produces an optimal or otherwise desired correlation is determined. A transform can be determined based on the offset and the transform can be applied to the rest of the features in the target image. Thus, the locations for the features in a target image can be determined by shifting the relative orientation between a target image and a reference image, using a transform based on an offset determined between fiducials in the images when overlaid.

The example of registration above, although set forth in regard to overlaying bright pixels, can be extended to fiducials having dark pixels, fiducials having intermediate intensity pixels and/or combinations of bright, intermediate and dark pixels. In this regard, bright pixels of a target fiducial can be overlaid with bright pixels of a virtual fiducial, intermediate intensity pixels of a target fiducial can be overlaid with intermediate intensity pixels of a virtual fiducial, and/or dark pixels of a target fiducial can be overlaid with dark pixels of a virtual fiducial.

In particular embodiments, the methods can be used for fiducials having different regions of different signal characteristic (for example fiducials in optical images can have regions of different brightness as exemplified by the bullseye fiducials having bright, dark and intermediate intensity rings). Fiducials having different regions of different intensity provide an advantage of increasing accuracy in cross correlations compared to use of fiducials having fewer intensity levels. Different intensity levels of the rings provide the advantage, in at least some embodiments, of increasing the accuracy of registration. If a bright ring from a virtual image is overlaid on a dark ring from a target image then cross-correlation is considered to be minimized. Overlaying regions of a virtual fiducial having different intensity levels with regions of a target fiducial having respective intensity levels allows for a more unique signature than would occur if signal levels did not differ (or if there were fewer different intensity levels evaluated). Thus, use of fiducial regions having increasing numbers of intensity levels can increase the accuracy of the determined offsets between target and virtual images.

Any of a variety of transform models can be used. Global transforms are particularly useful including, but not limited to, linear transforms or affine transforms. The transformations can include, for example, one or more of rotation, translation, scaling, shear or the like.

An elastic or non-rigid transform can also be useful, for example, to adjust for distortions in target detection data or reference data. Distortions can arise when using a detection apparatus that scans a line along they dimension of an object, the longest dimension of the line occurring along the x dimension. For example, stretching distortions can occur along the x dimension (and sometimes only along x). Distortions can arise for other detectors including, for example, spreading distortions in both x and y resulting from an area detector. An elastic or non-rigid transform can be used to correct for distortions such as linear distortions present in image data obtained from line scanning instruments or spreading distortions present in image data obtained from area detectors. Alternatively or additionally, a correction factor can be applied to the reference data, target data and/or the transform to correct distortions introduced (or expected to be introduced) by a particular detection apparatus. For embodiments where patterned features are imaged, a non-linear correction can be applied to feature locations as a function of x position. For example, the non-linear correction that is applied can be a third order polynomial to account for distortion arising from the optical system that was used for detection of the features.

As exemplified above, reference data can contain information about the position of a fiducial in an xy plane. For example, a reference image can include the xy position for a circular-shaped virtual fiducial or of two or more circular regions of a bulls-eye fiducial. Alternatively or additionally, reference data can include information about the position for these or other fiducials in the z dimension. In the case of imaging data, focus can be altered by translation along the z dimension. As such, an algorithm can be used to determine focus for the features of an object based on comparison of a virtual fiducial in a reference data set to a fiducial in the data from a target image.

Figure 3A:
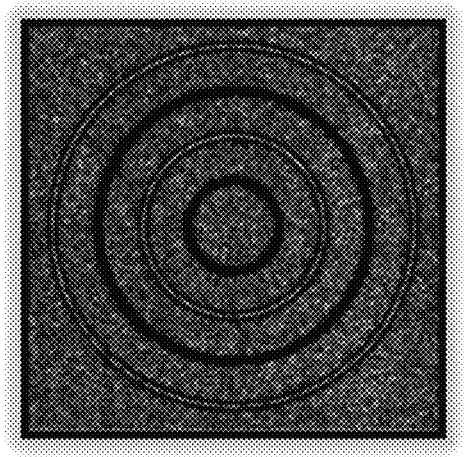
FIG. 3A shows an optical image of a patterned nucleic acid array including a fiducial.
Figure 3B:
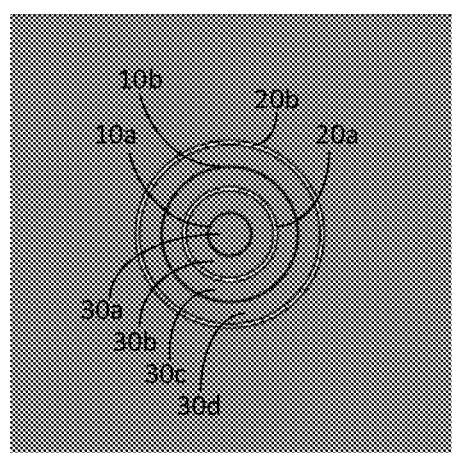
FIG. 3B shows a design drawing for the fiducial.
Figure 3C:
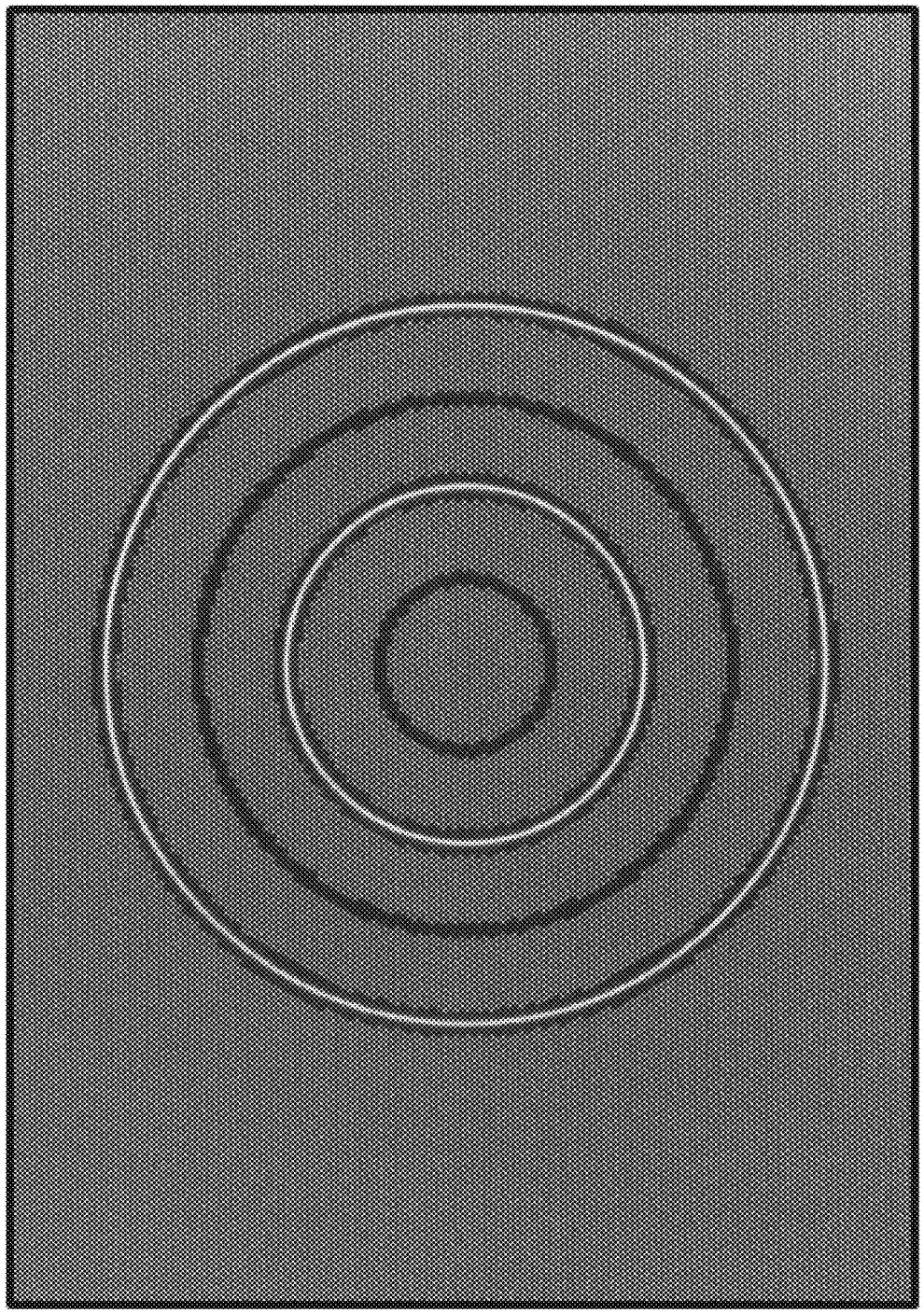
FIG. 3C shows a design drawing showing the fiducial and patterned features of the array.

In some embodiments, reference data can be obtained from empirical detection of an object. For example, an object can be detected under known conditions and the resulting data set used for registration of subsequent data acquired from the same object (albeit under different conditions). Alternatively, a model, standard or template object can be empirically detected to create reference data. This reference data can be used for registration of a similar object. In other embodiments reference data can be obtained from a theoretical object such as a design, blueprint or manufacturing specification for an object that is to be subsequently detected. For example, FIG. 3 shows an optical image obtained from a patterned nucleic acid array used for sequencing and also shows a design drawing that was used to guide fabrication of the fiducial on the array. In this example, a virtual fiducial can be created from the design drawing and this virtual fiducial can be used to register the optical image. The reference data for virtual fiducial of FIG. 3 can specify the coordinates for the various rings and can also specify an intensity level for each ring. For example, rings 10a and 10b can be assigned an intensity level that is indicative of a dark feature (e.g. intensity level of 0), rings 20a and 20b can be assigned an intensity level that is indicative of a bright feature (e.g. intensity level of 255) and the inner rings or regions 30a, 30b, 30c and 30d can be assigned an intensity level that is indicative of an intermediate feature (e.g. intensity level 128). As this case exemplifies, a virtual fiducial can include information indicative of one or more expected characteristics of a fiducial in a target image including, but not limited to, position, shape, orientation, coordinates, signal intensity, brightness, or color.

The methods and systems disclosed herein have been surprisingly found to determine the locations of features with an accuracy of 35-37 nm in a regular pattern having 400 nm diameter features and pitch of 700 nm. The location accuracy corresponds to 1 to 2 tenths of a pixel for the detection apparatus used. Accordingly, embodiments of the methods and systems set forth herein are contemplated to determine the locations of features with a variance of less than 5 μm, 1 μm, 500 nm, 250 nm, 100 nm, 50 nm, 40 nm or less. Depending upon the detection apparatus used the features can be determined at a variance of less than 1, 0.5, 0.4, 0.3, or 0.2 pixels of the detection apparatus. A regular pattern that is characterized at these accuracies can have features with shapes, sizes, pitches, and/or densities set forth herein previously.

In some embodiments, registration information can be communicated to a user via a graphical user interface (GUI). However, embodiments of the methods set forth herein can be carried out in an automated fashion that does not necessarily require human intervention. Accordingly, in some embodiments registration information (e.g. overlaid images of fiducials) is not communicated to a user, whether via a GUI or other format.

The methods and systems described herein can be used for an array of nucleic acids that has been subjected to any of a variety of nucleic acid sequencing techniques. Particularly applicable techniques are those wherein nucleic acids are attached at features of an array such that their relative positions do not change and wherein the array is repeatedly detected (e.g. using optical imaging) through multiple sequencing cycles. Embodiments in which images are obtained in different color channels, for example, coinciding with different labels used to distinguish one nucleotide base type from another are particularly applicable. In some embodiments, the process to determine the nucleotide sequence of a target nucleic acid can be an automated process. Preferred embodiments include sequencing-by-synthesis ("SBS") techniques.

Nucleic acids can be sequenced by providing, different nucleotides (or oligonucleotides) to an array of features so as to produce different signals at each feature, each signal corresponding to a specific species of nucleotide (or oligonucleotide) that has been added to the feature. For example, in a case where four different labels are used, corresponding to four different species of nucleotide (or oligonucleotide), individual images can be acquired, wherein each image captures a single color (or other signal type) among the four possible colors (or signal types). In this example, the signal color is different for each of the four different images, thereby producing a cycle of four color images that corresponds to the four possible nucleotides present at a particular position in the nucleic acid. In certain aspects, such methods can further include providing additional labeled nucleotides (or oligonucleotides) to the array of molecules, thereby producing a plurality of cycles of color images. Some exemplary sequencing techniques that produce images from multiple cycles, and often multiple images per cycle, are set forth below in further detail.

SBS techniques generally involve the enzymatic extension of a nascent nucleic acid strand through the iterative addition of nucleotides against a template strand. In traditional methods of SBS, a single nucleotide monomer may be provided to target nucleic acids in the presence of a polymerase in each delivery step. However, in the methods described herein, more than one type of nucleotide monomer can be provided to a target nucleic acid in the presence of a polymerase in each of the delivery steps.

SBS can utilize nucleotide monomers that have a terminator moiety or those that lack any terminator moieties. Methods utilizing nucleotide monomers lacking terminators include, for example, pyrosequencing and sequencing using gamma-phosphate-labeled nucleotides, as set forth in further detail below. In methods using nucleotide monomers lacking terminators, the number of nucleotides added to a nascent nucleic acid strand by polymerase in each cycle is generally variable and dependent upon the template sequence and the mode of nucleotide delivery. For SBS techniques that utilize nucleotide monomers having a terminator moiety, the terminator can be effectively irreversible under the sequencing conditions used, as is the case for traditional Sanger sequencing which utilizes dideoxynucleotides, or the terminator can be reversible as is the case for sequencing methods commercially available from Illumina, Inc. (San Diego, Calif.) or described in Bentley et al., *Nature* 456:53-59 (2008), WO 04/018497; WO 91/06678; WO 07/123744; U.S. Pat. Nos. 7,057,026; 7,329,492; 7,211,414; 7,315,019 or 7,405,281, and US Pat. App. Pub. No. 2008/0108082 A1, each of which is incorporated herein by reference.

Alternatively or additionally to the use of terminator moieties, SBS techniques can utilize nucleotide monomers that have a label moiety or those that lack a label moiety. Accordingly, incorporation events can be detected based on a characteristic of the label, such as fluorescence of the label; a characteristic of the nucleotide monomer such as molecular weight or charge; a byproduct of incorporation of the nucleotide, such as release of hydrogen or pyrophosphate; or the like. In embodiments, where two or more different nucleotides are simultaneously present in a sequencing reagent or extended nucleic acid, the different nucleotides can be distinguishable from each other. For example, the different nucleotides present in a sequencing reagent or extension product can have different labels and they can be distinguished using appropriate optics as exemplified by the sequencing platforms commercially available from Illumina, Inc. (San Diego, Calif.) or described in US Pat App. Pub. Nos. 2012/0270305 A1; 2013/0023422 A1; and 2013/0260372 A1; and U.S. Pat. Nos. 5,528,050; 5,719,391; 8,158,926 and 8,241,573, each of which is incorporated herein by reference.

Preferably in reversible terminator-based sequencing embodiments, the labels do not substantially inhibit extension under SBS reaction conditions. However, the detection labels can be removable, for example, by cleavage or degradation. Images can be captured following incorporation of labels into arrayed nucleic acid features. In particular embodiments, each cycle involves simultaneous delivery of four different nucleotide types to the array and each nucleotide type has a spectrally distinct label. Four images can then be obtained, each using a detection channel that is selective for one of the four different labels. Alternatively, different nucleotide types can be added sequentially and an image of the array can be obtained between each addition step. In either embodiment each image will show nucleic acid features that have incorporated nucleotides of a particular type. Different features will be present or absent in the different images due the different sequence content of each feature. However, the relative position of the features will remain unchanged in the images. Images obtained from such reversible terminator-SBS methods can be stored, processed and analyzed as set forth herein. Following the image capture step, labels can be removed and reversible terminator moieties can be removed for subsequent cycles of nucleotide addition and detection. Removal of the labels after they have been detected in a particular cycle and prior to a subsequent cycle can provide the advantage of reducing background signal and crosstalk between cycles.

Additional exemplary SBS systems and methods which can be utilized with the methods and systems described herein are described in U.S. Patent Application Publication No. 2007/0166705, U.S. Patent Application Publication No. 2006/0188901, U.S. Pat. No. 7,057,026, U.S. Patent Application Publication No. 2006/0240439, U.S. Patent Application Publication No. 2006/0281109, PCT Publication No. WO 05/065814, U.S. Patent Application Publication No. 2005/0100900, PCT Publication No. WO 06/064199 and PCT Publication No. WO 07/010,251, the disclosures of which are incorporated herein by reference.

Embodiments described herein may also be used with detection protocols that utilize fewer detection moieties than the number of analytes targeted for detection. For example, for detecting the incorporation of four analytes (e.g., during a sequencing reaction) each of the analytes can be differentially labeled and detected by one of four excitation/emission filters (e.g., fluorescent sequencing). Alternatively, methods and systems can also be utilized wherein one dye, or a plurality of dyes with similar detection characteristics, are used when detecting and differentiating multiple different analytes. As such, the number of detection moieties utilized is less than the number of analytes being detected which can also serve to reduce the number of imaging events needed to determine the presence of the different analytes. The use of fewer types of detection moieties can provide the advantage of simplifying the detection device needed to differentiate different types of analytes. Differentiation can be achieved instead based on differential treatment of analytes leading to their activation, inhibition, addition, removal, destruction, quenching, or enhancement at different time points that can be separately detected. Exemplary systems and methods that utilize fewer detection moieties than the number of analytes targeted for detection are described in U.S. Pat. App. Pub. No. 2013/0079232 A1, which is incorporated herein by reference.

Particular sequencing embodiments can utilize pyrosequencing techniques. Pyrosequencing detects the release of inorganic pyrophosphate (PPi) as particular nucleotides are incorporated into the nascent strand (Ronaghi et al. (1996) *Analytical Biochemistry* 242(1), 84-9; Ronaghi, M. (2001) *Genome Res.* 11(1), 3-11; Ronaghi et al. (1998) *Science* 281(5375), 363; U.S. Pat. Nos. 6,210,891; 6,258,568 and 6,274,320, the disclosures of which are incorporated herein by reference). In pyrosequencing, released PPi can be detected by being converted to adenosine triphosphate (ATP) by ATP sulfurylase, and the level of ATP generated can be detected via luciferase-produced photons. The nucleic acids to be sequenced can be attached to a repeating pattern of features in an array and the array can be imaged to capture the chemiluminescent signals that are produced due to incorporation of nucleotides at the features of the array. An image can be obtained after the array is treated with a particular nucleotide type (e.g. A, T, C or G). Images obtained after addition of each nucleotide type will differ with regard to which features in the array are detected. These differences in the image reflect the different sequence content of the features on the array. However, the relative locations of each feature will remain unchanged in the images. The images can be analyzed using the systems and methods set forth herein. For example, images obtained after treatment of the array with each different nucleotide type can be handled in the same way as exemplified herein for images obtained for reversible terminator-based sequencing methods.

Some embodiments involve sequencing by ligation techniques. Such techniques utilize DNA ligase to incorporate oligonucleotides and then the incorporated oligonucleotides can be identified. The oligonucleotides typically have different labels that are correlated with the identity of a particular nucleotide in a sequence to which the oligonucleotides hybridize. As with other SBS methods, an array having a repeating pattern of features to which target nucleic acids are attached can be used and images can be obtained following treatment of the array with the labeled sequencing reagents. Each image will show nucleic acid features that have incorporated labels of a particular type. Different features will be present or absent in the different images due the different sequence content of each feature, but the relative position of the features will remain unchanged in the images. Images obtained from ligation-based sequencing methods can be stored, processed and analyzed as set forth herein. Exemplary sequencing by ligation systems and methods which can be utilized with the methods and systems described herein are described in U.S. Pat. Nos. 6,969,488, 6,172,218, and 6,306,597, the disclosures of which are incorporated herein by reference.

It will be appreciated that any of the above-described sequencing processes can be incorporated into the methods and/or systems described herein. Furthermore, it will be appreciated that other known sequencing processes can be readily modified for use with the methods and/or systems described herein. It will also be appreciated that the methods and systems described herein are designed to be applicable with a variety of nucleic acid analysis technologies including, for example, gene expression analysis, genotyping, real time PCR and the like. Additionally, it will be appreciated that the methods and systems described herein have even wider applicability to any field where an object having a regular pattern of features is analyzed or tracked over time or from different perspectives.

As exemplified by the sequencing embodiments above, a method of the present disclosure can include the steps of (a) providing an object having a repeating pattern of features in an xy plane and a fiducial; (b) obtaining a target image of the object using a detection apparatus, wherein the target image includes the repeating pattern of features and the fiducial; (c) providing data from the target image to a computer, wherein the computer has reference data, wherein the reference data includes xy coordinates for a virtual fiducial; (d) performing an algorithm on the computer to determine locations for the features in the target image based on comparison of the virtual fiducial in the reference data to the fiducial in the data from the target image; and (e) repeating steps (b), (c) and (d) for a second target image of the object obtained using the detection apparatus at a second setting, wherein the second setting detects signals having a characteristic that is distinct from characteristics of the object detected in (b), wherein the algorithm determines locations for the features in the second target image based on comparison of the virtual fiducial in the reference data to the fiducial in the data from the second target image.

In the example of the sequencing embodiments, the different characteristics in the above method are the different colors emitted from different labels and the different settings are the different channels used to detect the different colors. Thus, the second setting in (e) can optionally detect optical signals at a different wavelength than a wavelength detected in (b).

As also exemplified by the sequencing embodiments, a target image processed in the above method can include a first subset of features that are dark and a second subset of features that produce a specific signal. This can be the case, for example, when the first subset of features incorporate a first species of label that is not detected in a particular channel and the second subset of features incorporate a second species of label that is detected in that particular channel. In the sequencing example, images obtained in different channels will show different subsets of features as producing a particular signal. Thus, in the method set forth above, at least some of the features in the first subset of features will produce a specific signal in the second target image and at least some of the features in the second subset of features will be dark in the second target image.

Multiple images of an object acquired in different channels can be registered with respect to each other using the methods set forth herein. The images from multiple channels, for example, four images obtained for four different labels detected in a sequencing method, can be combined to form a composite image once they have been registered with respect to each other. The resulting composite image can then be compared with images acquired at other cycles of the sequencing method. The images acquired at these other cycles can be images from individual channels, such that a composite image is compared to a single channel image. Alternatively, a composite image from one cycle can be compared to a composite image from another cycle. In particular embodiments these comparisons include registration methods set forth herein. Thus, a composite image can be registered to a single channel image or to another composite image.

This disclosure further provides a method of determining the locations of features in a repeating pattern, including the steps of (a) providing an object having a repeating pattern of features in an xy plane and a fiducial; (b) obtaining a target image of the object using a detection apparatus, wherein the target image includes the repeating pattern of features and the fiducial; (c) providing data from the target image to a computer, wherein the computer has reference data, wherein the reference data includes xy coordinates for a virtual fiducial; (d) performing an algorithm on the computer to determine locations for the features in the target image based on comparison of the virtual fiducial in the reference data to the fiducial in the data from the target image; (e) obtaining a plurality of images of the object using the detection apparatus, wherein each image in the plurality of images includes the repeating pattern of features and the fiducial; (f) providing data from the plurality of images to the computer; and (g) performing an algorithm on the computer to determine locations for the features in each of the plurality of images based on comparison of the virtual fiducial in the reference data to the fiducial in the data from each of the plurality of images, wherein the locations of the features in each of the images are determined.

As exemplified by the above method, multiple images obtained from an object can each be individually registered by comparison to one or more virtual fiducial that is present in reference data. For example in the case of images obtained across multiple cycles of a sequencing run, the image obtained for each channel during each cycle can be registered to the reference data separately. Accordingly, the above method can involve creating a plurality of data files specifying the locations of the features that are determined in (d) and (g).

In sequencing embodiments, the sequence of colors (or other signal characteristics) detected at each feature can be used to determine the nucleotide sequence for the nucleic acid species that is present at the feature. This is an example of the more general step that can optionally be included in a method set forth herein: comparing at least one characteristic of respective features across a plurality of data files to determine a property of the respective features. Again, the characteristic can be a sequence of detected signals and the property can be the nucleic acid sequence that is inferred from the sequence of signals.

In particular embodiments an object (or image data for an object) can include one or more coarse-alignment markers. Such markers can be used to roughly align a detection device with the object. For example, in embodiments where the detector is an optical scanning device, the object can contain one or more coarse-alignment markers that are used to roughly align the imaging optics with a particular location of the object that is to be detected. In this case the coarse-alignment markers can be positioned near the proximal edge of the object, the proximal edge being at or near the initiation point for scanning of the object. Coarse adjustment markers are particularly useful when an object is scanned in multiple swaths. In this case the markers can differ along the axis that is orthogonal to the scan direction (e.g. the markers can differ along the x axis when scanning occurs along the y axis). In this example, the markers can be strips of different width and/or spacing (for example, as is present in a typical barcode) and the detection system can recognize the relative location of the object based on recognition of the pattern for the coarse-alignment markers.

In a particular embodiment, a nucleic acid array can be present on a substrate that has a pattern of strips on the proximal edge of the substrate. An optical scanner can be used to image the array in multiple swaths. The strips function as coarse adjust markers, whereby the scanner is oriented with respect to each swath based on recognition of the pattern of the strips and movement of the imaging optics (and/or the array substrate) until the imaging optics are aligned to the desired swath. Each swath of the array will include one or more fiducials that are then used in methods set forth herein as a fine-adjust when registering images for analysis. In this way, both coarse-alignment marker(s) and fiducial(s) can be used by a detection system to locate features in a regular pattern on an object.

As exemplified above, a detection apparatus that is used in a method or system set forth herein can include a scanning detector that scans along the y dimension of the object, wherein the scanning detector scans parallel swaths of the object. The object can further include coarse-alignment markers that distinguish the relative locations of the swaths along the x dimension. The method can include a step of detecting one or more of the coarse-alignment markers with the detection apparatus, and determining the location of at least one of the swaths. Optionally, the method can include a step of adjusting the relative position of the detection apparatus and the object along the x dimension based on the location determined for the at least one of the swaths. In particular embodiments, the determining of the location of at least one of the swaths can be performed by an algorithm on a computer, such as the computer that will perform registration or feature identification based on comparison of target and virtual fiducials. Thus, a method of the present disclosure can include a step of performing the algorithm on the computer to determine locations for the features in the target image based on the comparison of the virtual fiducial in the reference data to the fiducial in the data from the target image and based on the location of the at least one of the swaths.

EXAMPLE I

Registration of Images Acquired During Sequencing of Nucleic Acids on Patterned Arrays of Nucleic Acid Features This example demonstrates high accuracy registration of images that were obtained during sequencing cycles of a patterned array of DNA features.

Flow cells having a pattern of gel-filled wells, each well occupied by a DNA colony, were prepared as set forth in U.S. patent application Ser. No. 13/787,396, which is incorporated herein by reference. Briefly, a nanowell substrate was fabricated using nanoimprint lithography to produce a hexagonal array of wells having a diameter of 400 nm and depth of 300 nm. The pitch of the array was 700 nm. A PAZAM polymer was coated on the substrate and removed by polishing as described in Example III of U.S. patent application Ser. No. 13/787,396, leaving an array of gel-filled wells. The patterned polymer substrate was then grafted with primers as described in U.S. patent application Ser. No. 13/784,368, which is incorporated herein by reference. Then the wells were seeded with phiX DNA, and clusters grown as described in U.S. patent application Ser. No. 13/783,043, which is incorporated herein by reference. The flow cell was sequenced on a HiSeq 2000 (Illumina, Inc., San Diego, Calif.).

The images were analyzed using the RTA protocol commercially available for HiSeq sequencers except that template generation and image registration were replaced with the method diagrammed in FIG. 4 and set forth below. An image of a swath 200 of the flow cell surface is shown, including four fiducials 201 through 204. The fiducials in the swath were used as target fiducials as exemplified by the higher magnification view of fiducial 204 in image 210. An image of a virtual fiducial is shown at similar magnification in 220. The virtual fiducial was generated from design drawings used to produce the fiducial in the nanowell substrate. Referring to the ring identification shown in FIG. 3, dark rings 10a and 10b were assigned an intensity level of 0, bright rings 20a and 20b were assigned an intensity level of 255 and intermediate rings 30a, 30b, 30c and 30d were assigned an intensity level of 128. The target fiducial in 210 was cross correlated to the virtual fiducial in 220 at all possible x,y offsets relative to one another to produce image 230. Arrow 240 indicates an x,y pixel shift that maximized correlation between the actual and virtual images. The area at arrow 240 was fit to a two-dimensional Gaussian to determine the subpixel x,y shift that maximized the cross correlation. This process was repeated three or more times in different regions of the image where the fiducials are located. The subpixel x,y offsets determined in each region were used to determine the affine transform describing how features in the designed array appeared on the image.

Preferably each swath contained 4 fiducials that were usable for the cross correlation and registration of the target images. However, it has been found that good results can be obtained with only 3 fiducials. Thus, the method can handle swaths in which one of the four fiducials that are present on the object is obscured or undetectable (e.g. due to a bubble or other aberration).

The sequencing results using the image registration process were as follows:

| | |
|---|---|
| Raw feature density: | 2059 K/mm$^2$ |
| Features passing filters (PF) | 78% |
| Density of PF features | 1603 K/mm$^2$ |
| Phasing/prephasing (%) | 0.205/0.285 |
| % ≥ Q30 | 93% |
| Cycles Error rated | 25 |
| Aligned reads | 97.6% |
| Error Rate | 0.11% |
| Intensity cycle 1 | 5193 |
| % intensity cycle 20 | 79% |

Figure 5:
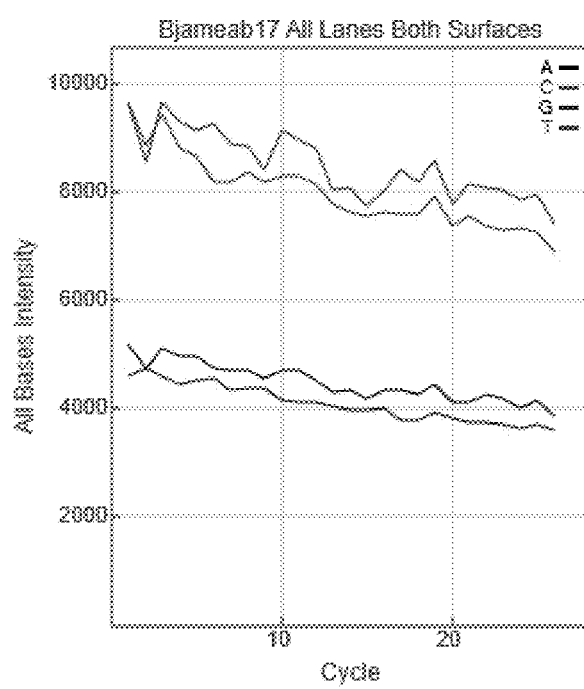
FIG. 5 shows a plot of intensity for bases read across 28 cycles of sequencing by synthesis on a patterned flow cell.

A plot of the intensity for all bases read across 28 cycles is shown in FIG. 5. The fiducial cross correlation sensitivity is shown in FIG. 6. The plots were generated by randomly adjusting x and y subpixel shift returned from the cross correlation by plus or minus s, where s ranged from 0.0 to 0.4 pixels. The data shows that the number of PF features can be maximized and the sequence data error rate can be minimized when the cross correlation is on the order of two-tenths of a pixel.

The transformed location sensitivity is shown in FIG. 7. Here the transformed locations were shifted in the x and y directions by s, where s ranged from −0.4 to 0.4 pixels. The data shows that producing affine transformed x,y values of feature locations on the order of 1 to 2 tenths of a pixel maximized the number of PF features and minimized the error rate of the sequence data.

The results demonstrate that higher feature density can be achieved on patterned flow cells in comparison to random flow cells generated by cluster methods commercially available from Illumina (San Diego, Calif.). Specifically, the PF density of 1600 K/mm$^2$ demonstrated on patterned flowcells is a substantial increase over the PF density from 1100 K/mm$^2$ typically obtained on non-patterned flowcells. As a result more sequencing data can be obtained per sequencing run using the commercial instrument.

The results also demonstrate lower cost and faster computation of sequencing results compared to current commercially available methods. For example, the methods set forth in this example avoided the template generation algorithm used by the HiSeg™ (Illumina, Inc., San Diego, Calif.). This equates to an 8 hour reduction in computation time for a 600 gigabase run on the HiSeq.

Throughout this application various publications, patents or patent applications have been referenced. The disclosures of these publications in their entireties are hereby incorporated by reference in this application in order to more fully describe the state of the art to which this invention pertains.

The term "comprising" is intended herein to be open-ended, including not only the recited elements, but further encompassing any additional elements.

Although the invention has been described with reference to the examples provided above, it should be understood that various modifications can be made without departing from the invention. Accordingly, the invention is limited only by the claims.

What is claimed is:

1. A computer-implemented method for registering features in repeating patterns, comprising:
   (a) providing an object having a repeating pattern of features in an xy plane and a fiducial; wherein the features comprise an area of 100 μm$^2$ or less and a pitch of 5 μm or less and wherein the fiducial comprises at least 3 concentric circles;
   (b) obtaining a target image of the object using a detection apparatus, wherein the target image comprises the repeating pattern of features and the fiducial, the features and fiducial being detectable in the target image;
   (c) loading, from reference data, xy coordinates for a virtual fiducial, wherein the virtual fiducial comprises a point of reference that is derived from a source other than the object or target image and wherein the virtual fiducial simulates predefined signal levels and xy coordinates for the at least 3 concentric circles, wherein the predefined signal levels comprise at least 3 different predefined signal levels;
   (d) computing a cross correlation between the virtual fiducial and the fiducial detectable in the target image to determine an offset between the virtual fiducial in the reference data and the fiducial in the data from the target image; and
   (e) transforming locations for the features in the target image based on the cross correlation.

2. The method of claim 1, wherein the reference data further comprises z coordinates for the virtual fiducial.

3. The method of claim 2, further comprising determining focus for the features in the image based on the comparison of the virtual fiducial in the reference data to the fiducial in the data from the target image.

4. The method of claim 1, wherein the comparison of (d) comprises determination of an offset between the virtual fiducial in the reference data and the fiducial in the data from the target image.

5. The method of claim 4, wherein transforming locations comprises shifting the relative orientation between the target image and the reference data, based on the offset, to improve the correlation between the target image and the reference data.

6. The method of claim 1, further comprising:
   repeating steps (b), (c), (d), and (e) for a second target image of the object obtained using the detection apparatus at a second setting, wherein the second setting detects signals having a characteristic that is distinct from characteristics of the object detected in (b), wherein locations for the features in the second target image are transformed based on the virtual fiducial in the reference data and the fiducial in the data from the second target image.

7. The method of claim 6, wherein the second setting detects optical signals at different wavelength than a wavelength detected in (b).

8. The method of claim 6, wherein the target image comprises a first subset of features of the object that are dark and a second subset of the features of the object that produce a specific signal.

9. The method of claim 8, wherein at least some of the features in the first subset of features of the object produce a specific signal in the second target image and at least some of the features in the second subset of features of the object are dark in the second target image.

10. The method of claim 1, wherein the target image is a composite of at least two images.

11. The method of claim 1, further comprising:
repeating steps (b), (c), (d), and (e) for a first, third and fourth image of the object obtained using the detection apparatus at a second, third and fourth setting, respectively, wherein each of the settings detects signals having a characteristic that is distinct from a characteristic of the object detected using the other settings, respectively, wherein locations for the features in the second, third and fourth images are transformed based on comparison of the virtual fiducials in the reference data to the fiducial in the data from the respective image.

12. The method of claim 1, wherein at least three fiducials are used in place of the fiducial and at least three virtual fiducials are used in place of the virtual fiducial.

13. The method of claim 1, wherein subsets of the features are arranged in geometric units that are repeated in the repeating pattern, and wherein the fiducial has a footprint that is larger than the geometric unit.

14. The method of claim 1, wherein the reference data further comprises a correction factor that adjusts the fiducial or the virtual fiducial for distortions of the detection apparatus.

15. The method of claim 14, wherein the reference data comprises a correction factor that adjusts for stretching distortions of the features along only the x dimension of the xy plane.

16. The method of claim 14, wherein the reference data comprises a correction factor that adjusts for area distortions of the features along the x and y dimensions.

17. The method of claim 1, wherein the detection apparatus comprises a scanning detector that scans along the y dimension of the object, wherein the scanning detector scans parallel swaths of the object.

18. The method of claim 17, wherein the object comprises course-alignment markers that distinguish the relative locations of the swaths along the x dimension.

19. The method of claim 18, further comprising detecting one or more of the course-alignment markers with the detection apparatus, and transforming the location of at least one of the swaths.

20. The method of claim 19, further comprising adjusting the relative position of the detection apparatus and the object along the x dimension based on the location transformed for the at least one of the swaths.

21. The method of claim 19, wherein the transforming locations is based on the location of the at least one of the swaths.

22. The method of claim 1, wherein subsets of the features are arranged in geometric units that are repeated in the repeating pattern, and wherein the geometric unit comprises an area of 500 $\mu m^2$ or less.

23. The method of claim 1, wherein the repeating pattern comprises a hexagonal arrangement of the features.

24. The method of claim 1, wherein the repeating pattern comprises a rectilinear arrangement of the features.

25. The method of claim 1, further comprising:
obtaining a plurality of images of the object using the detection apparatus, wherein each image in the plurality of images comprises the repeating pattern of features and the fiducial; transforming locations for the features in each of the plurality of images based on the virtual fiducial in the reference data to the fiducial in the data for each of the plurality of images.

26. The method of claim 25, further comprising creating a plurality of data files specifying locations of the features in each of the plurality of images.

27. The method of claim 26, further comprising comparing at least one characteristic of the respective features across the plurality of data files to determine a property of the respective features.

28. The method of claim 27, wherein the characteristic comprises a sequence of detected signals and the property comprises a nucleic acid sequence.

29. The method of claim 1, wherein the fiducial comprises circular symmetry as a ring.

30. The method of claim 1, wherein the locations for the features in the target image are relative to the xy coordinates for the virtual fiducial.

31. The method of claim 1, wherein the computing the cross correlation is based on registering the virtual fiducial in the reference data with the fiducial and the data for the target image.

32. A computer-implemented method for registering features in repeating patterns, comprising:
(a) providing an object having a repeating pattern of features in an xy plane and a fiducial, wherein the fiducial comprises at least 3 concentric circles; wherein the features comprise an area of 100 $\mu m^2$ or less and a pitch of 5 $\mu m$ or less;
(b) obtaining a target image of the object using a detection apparatus, wherein the target image comprises the repeating pattern of features and the fiducial, the features and fiducial being detectable in the target image;
(c) loading, from reference data, xy coordinates for a virtual fiducial, wherein the virtual fiducial comprises a point of reference that is derived from a source other than the object or target image and wherein the virtual fiducial comprises at least 3 different predefined signal levels corresponding to respective circles of the at least 3 concentric circles;
(d) computing a cross correlation to determine an offset between the virtual fiducial in the reference data and the fiducial in the data from the target image;
(e) transforming locations for the features in the target image based on the cross correlation; and
(f) repeating (b) through (e) for multiple cycles of imaging of the object.

* * * * *

UNITED STATES PATENT AND TRADEMARK OFFICE
CERTIFICATE OF CORRECTION

PATENT NO. : 10,540,783 B2
APPLICATION NO. : 14/530299
DATED : January 21, 2020
INVENTOR(S) : John S. Vieceli et al.

Page 1 of 1

It is certified that error appears in the above-identified patent and that said Letters Patent is hereby corrected as shown below:

In the Claims

In Column 27, Line 37, in Claim 18, after "object" insert -- further --.

In Column 28, Line 16 (Approx.), in Claim 27, after "of" delete "the".

Signed and Sealed this
Seventh Day of April, 2020

Andrei Iancu
*Director of the United States Patent and Trademark Office*